United States Patent
Kaida

(10) Patent No.: US 9,158,928 B2
(45) Date of Patent: Oct. 13, 2015

(54) IMAGE MANAGEMENT SYSTEM AND IMAGE MANAGEMENT APPARATUS

(71) Applicant: Yukiko Kaida, Tokyo (JP)

(72) Inventor: Yukiko Kaida, Tokyo (JP)

(73) Assignee: RICOH COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/324,558

(22) Filed: Jul. 7, 2014

(65) Prior Publication Data

US 2015/0015909 A1    Jan. 15, 2015

(30) Foreign Application Priority Data

Jul. 10, 2013  (JP) .................................. 2013-144920
Jun. 26, 2014  (JP) .................................. 2014-131595

(51) Int. Cl.
G06K 15/00    (2006.01)
*G06F 21/60*    (2013.01)
*G06F 21/31*    (2013.01)

(52) U.S. Cl.
CPC .............. *G06F 21/608* (2013.01); *G06F 21/31* (2013.01)

(58) Field of Classification Search
CPC .............. G06F 8/61; G06F 8/64; G06F 8/76; G06F 21/10; G06F 17/2785; G06F 17/30699; G06F 21/608; G06F 3/1205; G06F 3/1226; G06F 3/1232; G06F 3/1253; G06F 3/1275; G06F 3/1285; H04N 1/00307
USPC ......................................... 358/1.14, 1.15, 1.1
See application file for complete search history.

(56) References Cited

U.S. PATENT DOCUMENTS

2007/0216935 A1*  9/2007  Osamura et al. .............. 358/1.15
2012/0320419 A1*  12/2012  Ito ................................. 358/1.15

FOREIGN PATENT DOCUMENTS

JP    2007-296661    11/2007
JP    2012-098894    5/2012

* cited by examiner

*Primary Examiner* — Martin Mushambo
(74) *Attorney, Agent, or Firm* — Oblon, McClelland, Maier & Neustadt, L.L.P.

(57) ABSTRACT

According to an aspect of the present invention, an image management apparatus includes: an authentication processing unit which authenticates access according to an authentication request; an information-displayed-on-apparatus receiving unit which receives displayed-on-apparatus information acquired based on information transmitted to and displayed on an image recipient apparatus in association with transmission of the authentication request; a ticket processing unit which generates ticket link information by generating ticket information for identification of the authentication and linking a user identifier of an authenticated user and a device identifier, which is acquired using the displayed-on-apparatus information received in association with the authentication, of the image recipient apparatus to the ticket information; and an image providing unit which, upon receiving an image request from the image recipient apparatus, acquires the device identifier of the image recipient apparatus and checks an authentication status of the user based on the ticket information linked to the device identifier.

15 Claims, 17 Drawing Sheets

FIG.7A
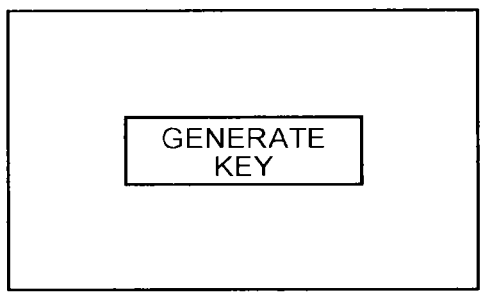
FIG.7B
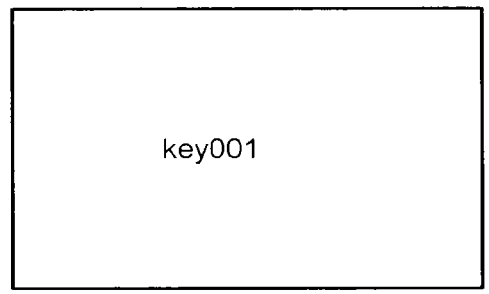
FIG.8
| DEVICE ID | KEY |
|---|---|
| MFP001 | key001 |
| MFP002 | key002 |
| MFP003 | key003 |
| ... | |

FIG.9A

USER ID

[ ]

PASSWORD

ENTER KEY

| USER ID | TICKET |
|---------|---------|
| user001 | ticket001 |
| user002 | ticket002 |
| user003 | ticket003 |
| ... | |

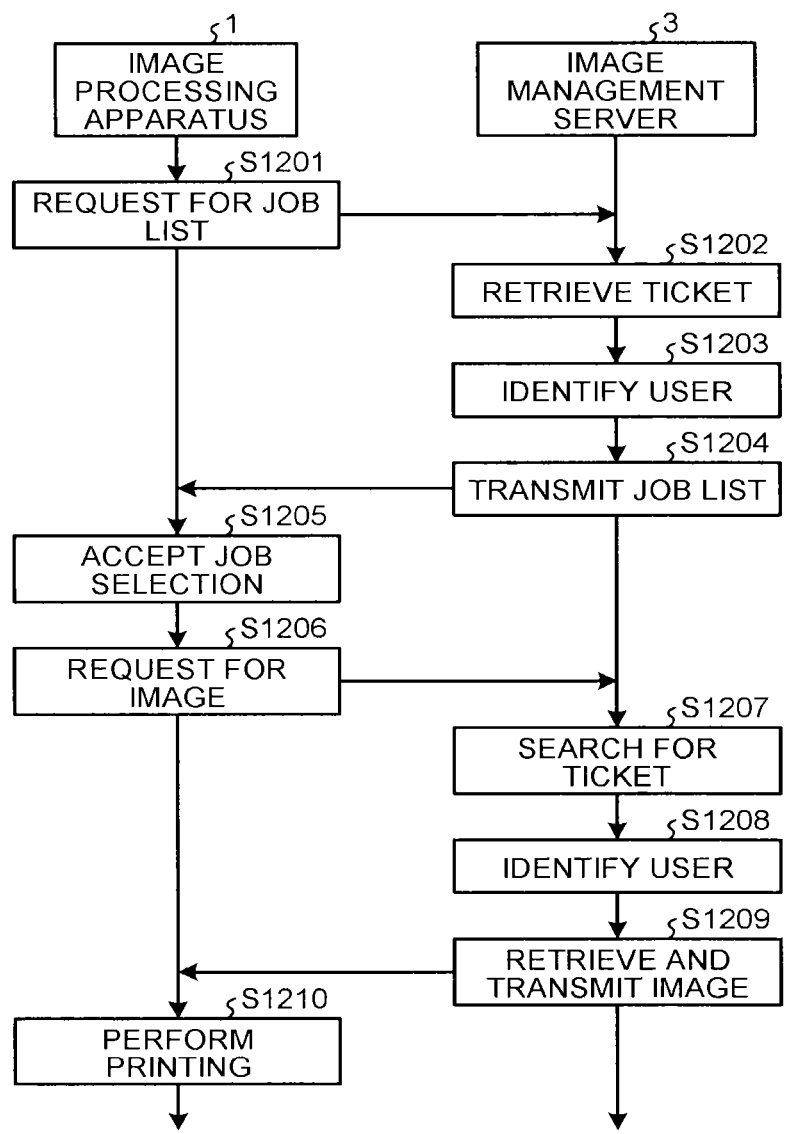

FIG.13A
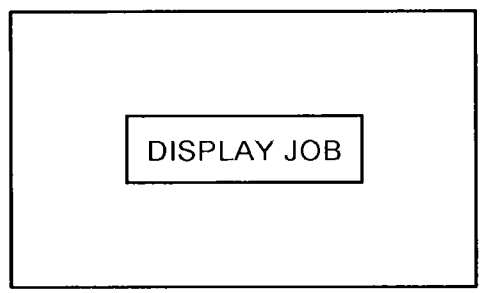
FIG.13B
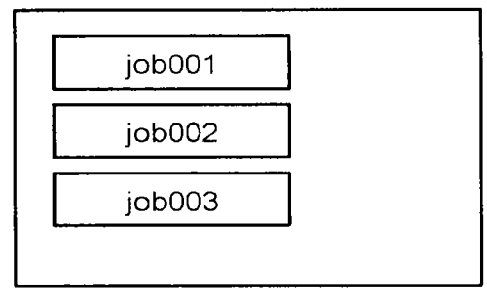
FIG.14
| USER ID | JOB ID |
|---------|--------|
| user001 | job001 |
| user002 | job002 |
| user003 | job003 |
| ... | |

FIG.15

| JOB ID | IMAGE ID |
|---|---|
| job001 | image001 |
| job017 | image017 |
| job037 | image037 |
| ... | |

| DEVICE ID | TICKET | JOB ID |
|---|---|---|
| MFP001 | ticket001 | job001 |
| MFP002 | ticket002 | job002 |
| MFP003 | ticket003 | job003 |
| ... | | |

FIG.24A
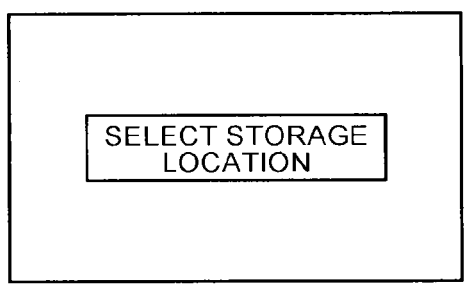
FIG.24B
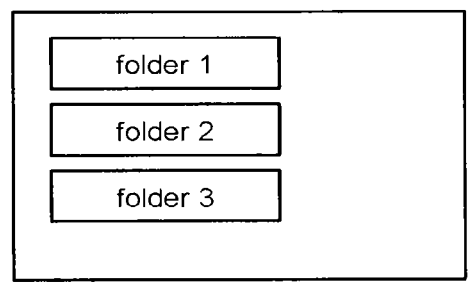
FIG.25
| USER ID | STORAGE LOCATION |
|---------|------------------|
| user001 | ¥¥xxxx¥xxxx¥xxxx¥folder 1 |
| user001 | ¥¥xxxx¥xxxx¥xxxx¥folder 2 |
| user001 | ¥¥xxxx¥xxxx¥xxxx¥folder 3 |
| ... | |

IMAGE MANAGEMENT SYSTEM AND IMAGE MANAGEMENT APPARATUS

CROSS-REFERENCE TO RELATED APPLICATION(S)

The present application claims priority to and incorporates by reference the entire contents of Japanese Patent Application No. 2013-144920 filed in Japan on Jul. 10, 2013 and Japanese Patent Application No. 2014-131595 filed in Japan on Jun. 26, 2014.

BACKGROUND OF THE INVENTION

1. Field of the Invention

The present invention relates generally to image management systems and image management apparatuses and, more particularly, to a technique for enhancing information security in a situation where a portable terminal is used as an interface for an image processing apparatus.

2. Description of the Related Art

Increasing electronification of information of recent years makes printers and facsimiles used in outputting electronified information and image processing apparatuses, such as scanners, used in electronifying documents indispensable. Such an image processing apparatus is often constructed into a multifunction peripheral (MFP) having an image capturing function, an image forming function, a communication function, and or the like and therefore usable as a printer, a facsimile, a scanner, and or a copier.

Japanese Laid-open Patent Application No. 2007-296661 discloses an example of a system including such an image processing apparatus and configured such that the image processing apparatus downloads a data set from data sets deposited in a server and performs printing of the downloaded data set. Japanese Laid-open Patent Application No. 2007-296661 proposes a technique for increasing information security of data transfer of the to-be-printed data.

Meanwhile, functionality improvement of mobile phones over recent years has led to proliferation of smart phones having information processing capability similar to that of PCs and portable information processing devices such as tablet personal computers (PCs). Hereinafter, such smart phones and portable information processing devices are referred to as "portable terminals".

Such a portable terminal typically includes interfaces for a touch panel, a global positioning system (GPS) function, an accelerometer, a wireless communication function, and the like and is usable for various purposes which depend on functions provided by software programs (program applications) installed in the portable terminal. Accordingly, the portable terminal may be used as a display panel for manipulating such an image processing apparatus as described above.

Some type of image processing apparatus includes an operating unit which is formed only of a small liquid crystal display and simple hard keys, for example, and therefore poor in operability. Accordingly, it is worthwhile to use a portable terminal, interfaces of which are configurable using a touch panel and applications, as an operating unit of an image processing apparatus.

Assume a situation where such a system in which a portable terminal is used as an operating unit of an image processing apparatus is linked with another apparatus (server) via a network as in the technique disclosed in Japanese Laid-open Patent Application No. 2007-296661. With this system, a user needs to be authenticated before the user accesses information stored in the server or utilizes a function provided by the server. Because the portable terminal is used as a user interface, it is necessary to make authentication results consistent among the three devices, which are the image processing apparatus, the server, and the portable terminal.

The above-described necessity will not arise in a configuration in which: an image processing apparatus and a portable terminal are one-to-one communicable; the portable terminal operates in relation only to the image processing apparatus or, in other words, the portable terminal transfers operational information only to and from the image processing apparatus; and the server is accessed only by the image processing apparatus. This is because authentication to access the server is required only between the server and the image processing apparatus.

However, to allow the image processing apparatus to transfer operational information to and from the portable terminal, it is necessary to add a function therefor to the image processing apparatus. However, an image processing apparatus having such a function is generally equipped with ample operating units including a touch panel. Accordingly, using a portable terminal as an operating unit of such an image processing apparatus will be less worthwhile.

Under the circumstances, there is a need for a technique which, in a situation where a terminal controlled independently of an image processing apparatus is used as an operating unit of the image processing apparatus, enhances information security in authentication of another device.

It is an object of the present invention to at least partially solve the problem in the conventional technology.

SUMMARY OF THE INVENTION

It is an object of the present invention to at least partially solve the problems in the conventional technology.

According to the present invention, there is provided an image management system comprising: an image management apparatus managing images, the images being providable via a network; a portable information-processing terminal configured to display a screen via which an authentication request is to be issued to the image management apparatus; and an image recipient apparatus configured to be provided with one or more of the images managed by the image management apparatus, wherein the portable information-processing terminal includes an authentication-request transmitting unit configured to transmit the authentication request responsive to an action performed by a user on the displayed screen, and an information-displayed-on-apparatus transmitting unit configured to transmit displayed-on-apparatus information acquired based on information displayed on the image recipient apparatus in association with transmission of the authentication request to a destination of the authentication request, and the image management apparatus includes an authentication processing unit configured to perform authentication of the user's access to the image management apparatus in response to the authentication request, a ticket processing unit configured to generate ticket link information by generating ticket information for individual identification of the access authentication, linking a user identifier of the authenticated user to the ticket information, acquiring a device identifier of the image recipient apparatus by using the displayed-on-apparatus information received in association with the authentication, and linking the device identifier to the ticket information, and an image providing unit configured to provide an image requested by an image request received from the image recipient apparatus, wherein the image providing unit is configured to, when receiving the image request, acquire the device identifier of the source device of the image request, the device identifier being for individual identification of the source device, and check an authentication status of a user of the source device of the image request based on ticket information linked to the acquired device identifier.

The present invention also provides an image management system comprising: an image management apparatus managing images, the images being providable via a network; a portable information-processing terminal configured to display a screen via which an authentication request is to be issued to the image management apparatus; and an image storing apparatus configured to store an image in the image management apparatus, wherein the portable information-processing terminal includes an authentication-request transmitting unit configured to transmit the authentication request responsive to an action performed by a user on the displayed screen, and an information-displayed-on-apparatus transmitting unit configured to transmit displayed-on-apparatus information acquired based on information displayed on the image storing apparatus association with transmission of the authentication request to a destination of the authentication request, the image management apparatus includes an authentication processing unit configured to perform authentication of the user's access to the image management apparatus in response to the authentication request, a ticket processing unit configured to generate ticket link information by generating ticket information for individual identification of the access authentication, linking the ticket information to a user identifier of the authenticated user, acquiring a device identifier of the image storing apparatus by using the displayed-on-apparatus information received in association with the authentication, and linking the device identifier to the ticket information, and an image storing unit configured to receive an image from the image storing apparatus and store the image in a recording medium, wherein the image storing unit is configured to acquire the device identifier of the image storing apparatus, the device identifier being for individual identification of the image storing apparatus from which the image is transmitted, check an authentication status of a user based on the ticket information linked to the acquired device identifier, and determine a storage location of the image based on link information in which image storage locations and user identifiers including the user identifier are linked to each other.

The present invention also provides an image management system for managing image information sets, the image management system including one or more information processing apparatuses, accepting authentication of an image processing apparatus connected to the image management system for the image information sets via an operation terminal connected to the image management system, and comprising: a repository unit configured to store the image information sets; a generating unit configured to, upon receiving device identity information for identification of a transmission-source image processing apparatus, the transmission-source image processing apparatus being one of the image processing apparatuses, from the transmission-source image processing apparatus, generate first information to be linked to the device identity information; a first storing unit configured to link the first information generated by the generating unit to the device identity information and store the first information linked to the device identity information in a storage unit; a first transmitting unit configured to transmit the first information generated by the generating unit to the transmission-source image processing apparatus; an authentication unit configured to, upon receiving an authentication request from the operation terminal, perform predetermined authentication according to the authentication request; an authentication-identity-information generating unit configured to generate authentication identity information when the predetermined authentication is successfully performed by the authentication unit; a second storing unit configured to link the authentication identity information generated by the authentication-identity-information generating unit to predetermined information related to the authentication request and store the authentication identity information linked to the predetermined information in the storage unit; a second transmitting unit configured to transmit the authentication identity information generated by the authentication-identity-information generating unit to the operation terminal, the operation terminal being a transmission source of the authentication request; a third storing unit configured to, upon receiving, from the operation terminal, the authentication identity information transmitted from the second transmitting unit and the first information transmitted from the first transmitting unit, link the device identity information stored in the storage unit as being linked to the first information to the received authentication identity information, and store the device identity information linked to the first information in the storage unit; an acquisition-request receiving unit configured to receive an acquisition request from an image processing apparatus of the image processing apparatuses, the acquisition request requesting for an image information set of the image information sets deposited in the repository unit and containing the device identity information for identification of the image processing apparatus; a determining unit configured to determine whether or not the authentication identity information stored in the storage unit as being linked to the device identity information contained in the acquisition request received by the acquisition-request receiving unit is valid; and an image-information transmitting unit configured to, if the determining unit determines that the authentication identity information is valid, transmit the image information set requested by the acquisition request received by the acquisition-request receiving unit to the image processing apparatus from which the acquisition request is transmitted.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIGS. 7A and 7B are diagrams illustrating examples of display on a display panel of the image processing apparatus according to the first embodiment;

FIG. 8 is a diagram illustrating link information in which device IDs and keys are linked according to the first embodiment;

FIGS. 9A and 9B are diagrams illustrating examples of a login screen and a key entry screen of the mobile terminal according to the first embodiment;

FIG. 10 is a diagram illustrating link information in which user IDs and tickets are linked according to the first embodiment;

FIG. 11 is a diagram illustrating link information in which device IDs and tickets are linked according to the first embodiment;

FIG. 12 is a sequence diagram illustrating operation of the system according to the first embodiment;

FIGS. 13A and 13B are diagrams illustrating examples of display on the display panel of the image processing apparatus according to the first embodiment;

FIG. 14 is a diagram illustrating an example of job management information according to the first embodiment;

FIG. 15 is a diagram illustrating an example of image management information according to the first embodiment;

FIGS. 24A and 24B are diagrams illustrating examples of display on the display panel of the image processing apparatus according to the fifth embodiment; and FIG. 25 is a diagram illustrating link information in which user IDs and storage locations are linked according to the fifth embodiment.

DETAILED DESCRIPTION OF THE PREFERRED EMBODIMENTS

Exemplary embodiments of the present invention are described in detail below with reference to the accompanying drawings.

First Embodiment

An image management system according to a first embodiment of the present invention includes three devices: an image management apparatus; a mobile terminal; and a server which provides functions via a network. The devices share a result of authentication obtained by performing authentication a single time while retaining a high level of security.

A mobile terminal such as a smart phone or a tablet PC typically has a full-screen touch panel. Using such a mobile device as user interface for an image processing apparatus allows operating the image processing apparatus through ample user interface rather than through limited user interface provided in the image processing apparatus.

Furthermore, the need of causing the image processing apparatus to perform complicated processing can also be obviated by causing processing to be completed only between the mobile terminal having general image processing functionality and the server. As a result, functionality of the entire system can be extended only by extending functionality of the mobile terminal using an application or the like.

Figure 1:
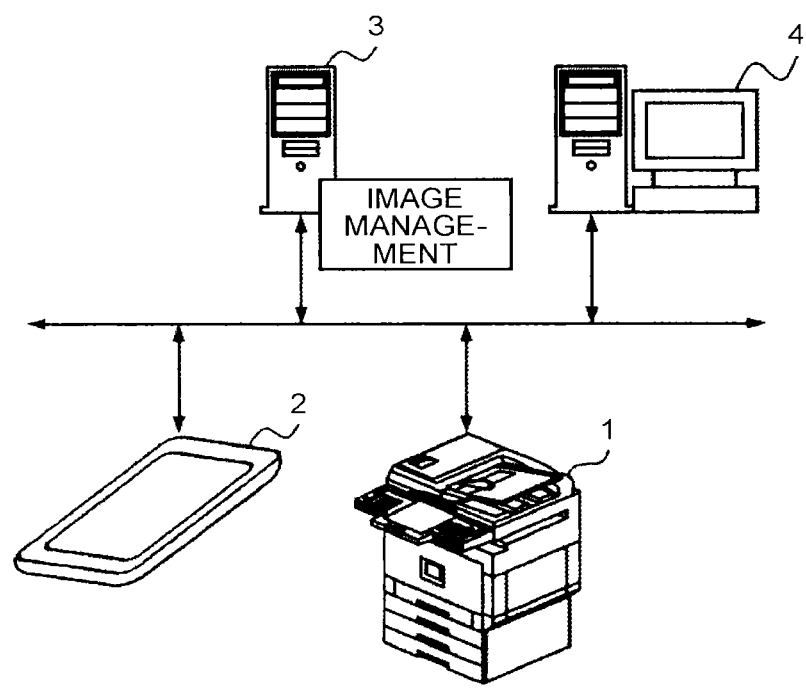
FIG. 1 is a diagram illustrating an implementation model of an image management system according to a first embodiment of the present invention.

FIG. 1 is a diagram illustrating an implementation model of the image processing system according to the first embodiment. Referring to FIG. 1, the image processing system includes an image processing apparatus 1, a mobile terminal 2, an image management server 3, and a client terminal 4 connected to each other via a network such as the Internet and or a local area network (LAN).

The image processing apparatus 1 is a multifunction peripheral (MFP) having an image capturing function, an image forming function, a communication function, and or the like and therefore usable as a printer, a facsimile, a scanner, and or a copier. The mobile terminal 2 is a portable information-processing terminal such as a smart phone, a tablet PC, or a personal digital assistant (PDA).

The image management server 3 is a server providing functions related to image processing via the network. In the system according to the first embodiment, the image management server 3 provides a function as an image management apparatus by receiving and depositing print jobs transmitted from the client terminal 4 and transmitting a print job in response to a request from the image processing apparatus 1. The image management server 3 also provides a function of linking a result of authentication to the image processing apparatus 1 and storing the result in response to a login authentication request from the mobile terminal 2. This function is one of functions according to aspects of the first embodiment.

The client terminal 4 is a typical information processing apparatus and has a function of transmitting a print job, which is a request to perform printing. In the system according to the first embodiment, the client terminal 4 does not directly transmit the print job to the image processing apparatus 1 but transmits the print job to the image management server 3. The print job deposited in the image management server 3 is acquired and printing is performed by the image processing apparatus 1 manipulated by a user of the client terminal 4.

Figure 2:
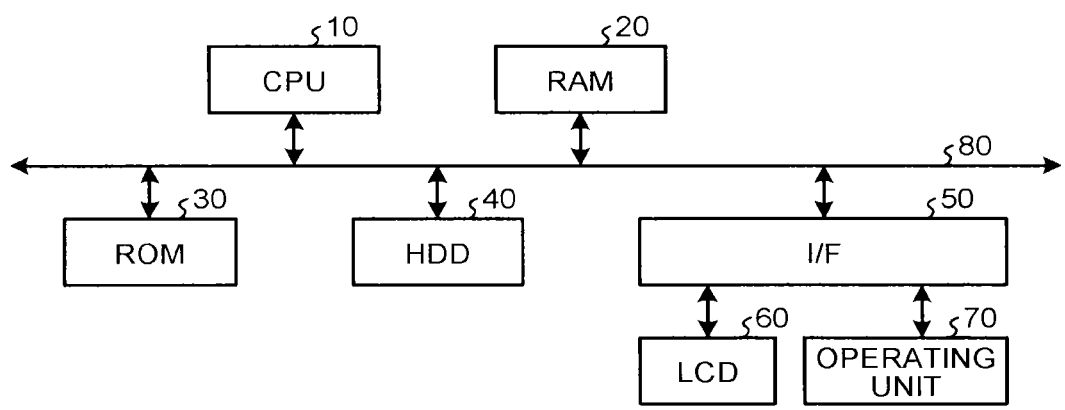
FIG. 2 is a block diagram illustrating a hardware configuration of an information processing apparatus according to the first embodiment.

A hardware configuration of an information processing apparatus corresponding to each of the devices included in the image processing system according to the first embodiment is described below. FIG. 2 is a block diagram illustrating a hardware configuration of the information processing apparatus according to the first embodiment. Referring to FIG. 2, the information processing apparatus according to the first embodiment includes a configuration similar to a typical server, a PC, or the like.

More specifically, the information processing apparatus according to the first embodiment includes a central processing unit (CPU) 10, a random access memory (RAM) 20, a read only memory (ROM) 30, a hard disk drive (HDD) 40, and an interface (I/F) 50 connected to each other via a bus 80. A liquid crystal display (LCD) 60 and an operating unit 70 are connected to the I/F 50. When configured as the image processing apparatus 1, the information processing apparatus further includes an engine which performs printing and scanning.

The CPU 10 is a computing unit and provides overall control of operations of the information processing apparatus. The RAM 20 is a volatile storage medium to and from which information can be written and read at high speed and used as a working area for information processing by the CPU 10. The ROM 30 is a read-only non-volatile storage medium and stores programs such as firmware. The HDD 40 is a readable and writable non-volatile storage medium and stores an operating system (OS), various types of control programs, application programs, and the like.

The I/F 50 connects and controls between the bus 80, and hardware of various types, the network, and the like. The LCD 60 is a visual user interface providing visual indication of a status of the information processing apparatus to a user. The operating unit 70 is an interface, such as a keyboard, a mouse, hard buttons of various types, and a touch panel, for use by a user to enter information to the information processing apparatus.

With such a hardware configuration described above, a software control unit is implemented by computations performed by the CPU 10 according to a program(s) stored in the ROM 30 and a program(s) loaded into the RAM 20. Functional blocks which implement functions of the devices included in the image processing system according to the first embodiment are implemented in a combination of the software control unit configured as described above and hardware.

Figure 3:
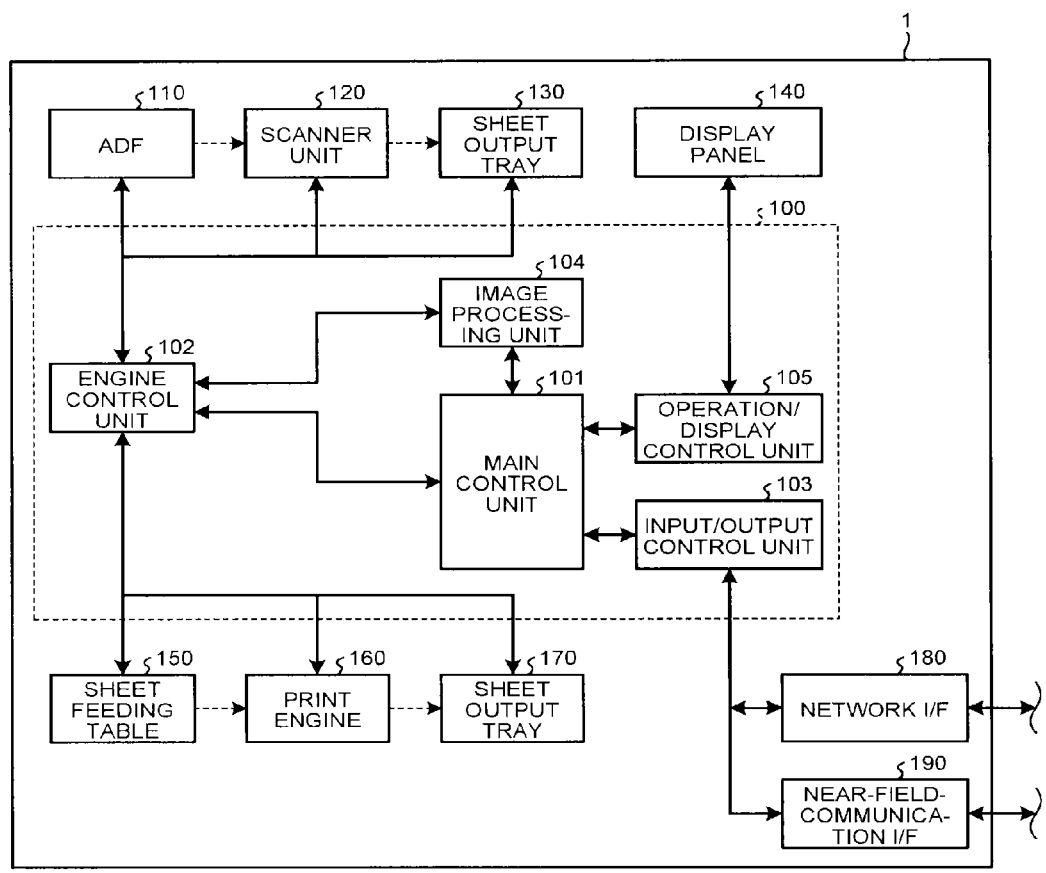
FIG. 3 is a block diagram illustrating a functional configuration of an image processing apparatus according to the first embodiment.

Functions of the image processing apparatus 1 according to the first embodiment are described below. FIG. 3 is a block diagram illustrating a functional configuration of the image processing apparatus 1 according to the first embodiment. Referring to FIG. 3, the image processing apparatus 1 according to the first embodiment includes a controller 100, an automatic document feeder (ADF) 110, a scanner unit 120, a sheet output tray 130, a display panel 140, a sheet feeding table 150, a print engine 160, a sheet output tray 170, a network I/F 180, and a near-field-communication I/F 190.

The controller 100 includes a main control unit 101, an engine control unit 102, an input/output control unit 103, an image processing unit 104, and an operation/display control unit 105. As illustrated in FIG. 3, the image processing apparatus 1 according to the first embodiment is configured as an MFP including the scanner unit 120 and the print engine 160. In FIG. 3, electrical connections are indicated by solid lines with arrows; paths of sheets are indicated by dashed lines with arrows.

The display panel 140 is an output interface which provides visual indication of a status of the image processing apparatus 1 as well as an input interface (operating unit 70) implemented in a touch panel for use by a user in directly manipulating the image processing apparatus 1 or entering information to the image processing apparatus 1. The network I/F 180 is an interface which allows the image processing apparatus 1 to communicate with another device via the network. An Ethernet (registered trademark) interface or a universal serial bus (USB) interface may be used as the network I/F 180.

The near-field-communication I/F 190 is an interface which allows the image processing apparatus 1 to communicate with another device through near field communication. A Bluetooth (registered trademark) interface, a wireless fidelity (Wi-Fi) (registered trademark) interface, a FeliCa (registered trademark) interface, or a like interface may be used as the near-field-communication I/F 190.

The controller 100 is implemented in a combination of software and hardware. More specifically, the controller 100 includes a software control unit implemented by computations performed by the CPU 10 according to a program(s) stored in the ROM 30 and a program(s) loaded into the RAM 20 and hardware such as an integrated circuit board. The controller 100 functions as a control unit which provides overall control of the image processing apparatus 1.

The main control unit 101 serves to control units included in the controller 100 and issues commands to the units of the controller 100. The engine control unit 102 serves as a drive unit which controls or drives the print engine 160, the scanner unit 120, and the like. The input/output control unit 103 inputs a signal and a command, which are input to the image processing apparatus 1 via the network I/F 180 or the near-field-communication I/F 190, to the main control unit 101. The main control unit 101 controls the input/output control unit 103 and accesses another device via the network I/F 180 or the near-field-communication I/F 190 over the network.

The image processing unit 104 generates drawing information from information representing an image to be printed under control of the main control unit 101. The drawing information is information for printing, by the print engine 26 which is an image forming unit, the image to be formed. Furthermore, the image processing unit 104 generates image data by processing captured-image data fed from the scanner unit 120. The image data is information obtained by scanning and stored in the image processing apparatus 1 or transmitted to another device via the network I/F 180 or the near-field-communication I/F 190.

In a scenario where the image processing apparatus 1 operates as a printer, the input/output control unit 103 receives a print job via the network I/F 180 first. The input/output control unit 103 transfers the received print job to the main control unit 101. Upon receiving the print job, the main control unit 101 controls the image processing unit 104 to generate drawing information from document information or image information contained in the print job.

When drawing information has been generated by the image processing unit 104, the engine control unit 102 forms an image on a sheet of recording medium (hereinafter, "sheet") fed from the sheet feeding table 150 according to the generated drawing information. The print engine 160 can be embodied as an inkjet image forming mechanism or an electrophotographic image forming mechanism. The sheet on which the print engine 160 has formed the image is discharged onto the sheet output tray 170.

In a scenario where the image processing apparatus 1 operates as a scanner, the operation/display control unit 105 or the input/output control unit 103 transfers a scan execution signal to the main control unit 101 in accordance with user's action performed on the display panel 140 or a scan execution command fed from an external device via the network T/F 180. The main control unit 101 controls the engine control unit 102 according to the received scan execution signal. The engine control unit 102 drives the ADF 110, causing the ADF 110 to convey an original document, which is to be image-captured, placed in the ADF 110 to the scanner unit 120.

The engine control unit 102 drives the ADF 110, causing the ADF 110 to capture an image of the original conveyed from the ADF 110. In a situation where no original is placed in the ADF 110 but an original is directly placed in the scanner unit 120, the scanner unit 120 captures an image of the placed original under control of the engine control unit 102. In short, the scanner unit 120 serves as an image capturing unit.

Image capture is performed as follows. An imaging device such as a charge-coupled device (CCD) included in the scanner unit 120 optically scans an original and outputs optical information, from which captured-image information is generated. The engine control unit 102 transfers the captured-image information generated by the scanner unit 120 to the image processing unit 104. The image processing unit 104 generates drawing information from the captured-image information received from the engine control unit 102 under control of the main control unit 101. The image information generated by the image processing unit 104 is stored in a storage medium, such as the HDD 40, mounted on the image processing apparatus 1. The image information generated by the image processing unit 104 is stored in the HDD 40 or the like or, alternatively, transmitted by the input/output control unit 103 to an external device via the network I/F 180 or the near-field-communication I/F 190 as instructed by a user.

In a scenario where the image processing apparatus 1 operates as a copier, the image processing unit 104 generates drawing information from captured-image information transmitted from the scanner unit 120 and received by the engine control unit 102 or from image information generated by the image processing unit 104. As in the case where the image processing apparatus 1 operates as the printer, the engine control unit 102 drives the print engine 160 according to the drawing information.

Figure 4:
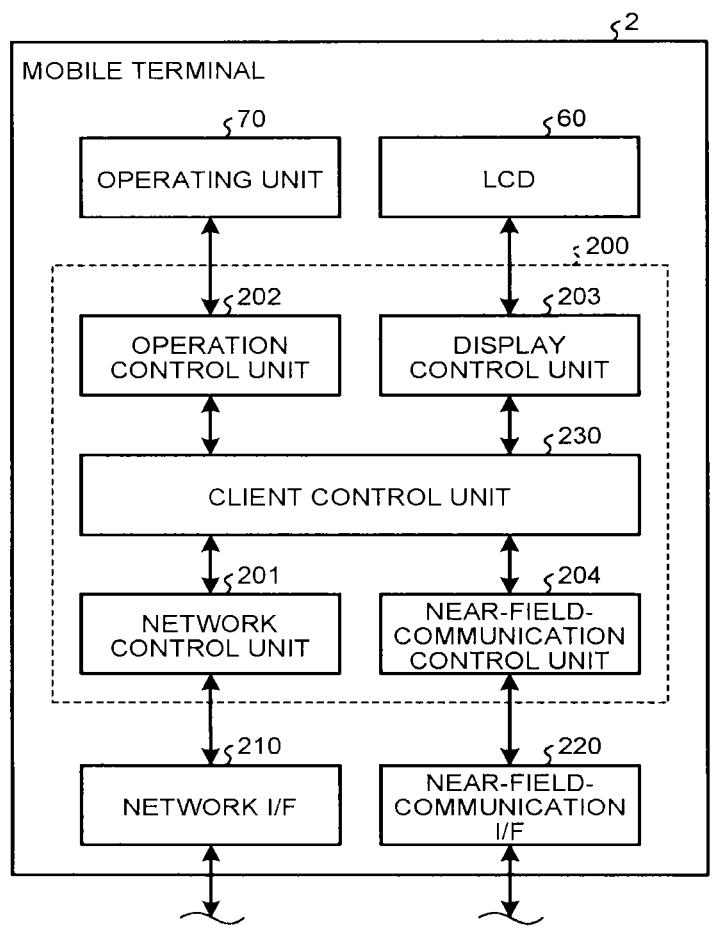
FIG. 4 is a block diagram illustrating a functional configuration of a mobile terminal according to the first embodiment.

A functional configuration of the mobile terminal 2 according to the first embodiment is described below with reference to FIG. 4. Referring to FIG. 4, the mobile terminal 2 according to the first embodiment includes, in addition to the LCD 60 and the operating unit 70 described above with reference to FIG. 2, a controller 200, a network I/F 210, and a near-field-communication I/F 220. The controller 200 includes a network control unit 201, an operation control unit 202, a display control unit 203, a near-field-communication control unit 204, and a client control unit 230.

The network I/F 210 is an interface which allows the mobile terminal 2 to communicate with another device via the network. An Ethernet (registered trademark) interface or a like interface may be used as the network I/F 210. The near-field-communication I/F 220 is an interface which allows the mobile terminal 2 to communicate with another device through near field communication. A Bluetooth (registered trademark) interface, a Wi-Fi (registered trademark) interface, a FeliCa (registered trademark) interface, or a like interface may be used as the near-field-communication I/F 220. Each of the network I/F 210 and the near-field-communication I/F 220 is implemented by the I/F 50 illustrated in FIG. 2.

The controller 200 is implemented in a combination of software and hardware. The controller 200 is a control unit which provides overall control of the mobile terminal 2. The network control unit 201 acquires information input to the mobile terminal 2 via the network I/F 210 and transmits information to another device via the network I/F 210. The near-field-communication control unit 204 acquires information input to the mobile terminal 2 via the near-field-communication I/F 220 and transmits information to another device via the near-field-communication I/F 220.

The operation control unit 202 acquires a signal indicating what action is performed by a user on the operating unit 70 and inputs the signal to a module, such as the client control unit 230, operating in the mobile terminal 2. The display control unit 203 causes the LCD 60 to display a screen, such as a graphical user interface (GUI) implemented by the client control unit 230, of the mobile terminal 2.

The client control unit 230 is implemented by software program installed and running on the mobile terminal 2 to allow the mobile terminal 2 to utilize functions provided by the image processing system according to the first embodiment. The client control unit 230 implements a function of issuing a command for manipulating the image processing apparatus 1, a function of displaying a GUI for manipulating the image processing apparatus 1 on the mobile terminal 2, and a like function.

Figure 5:
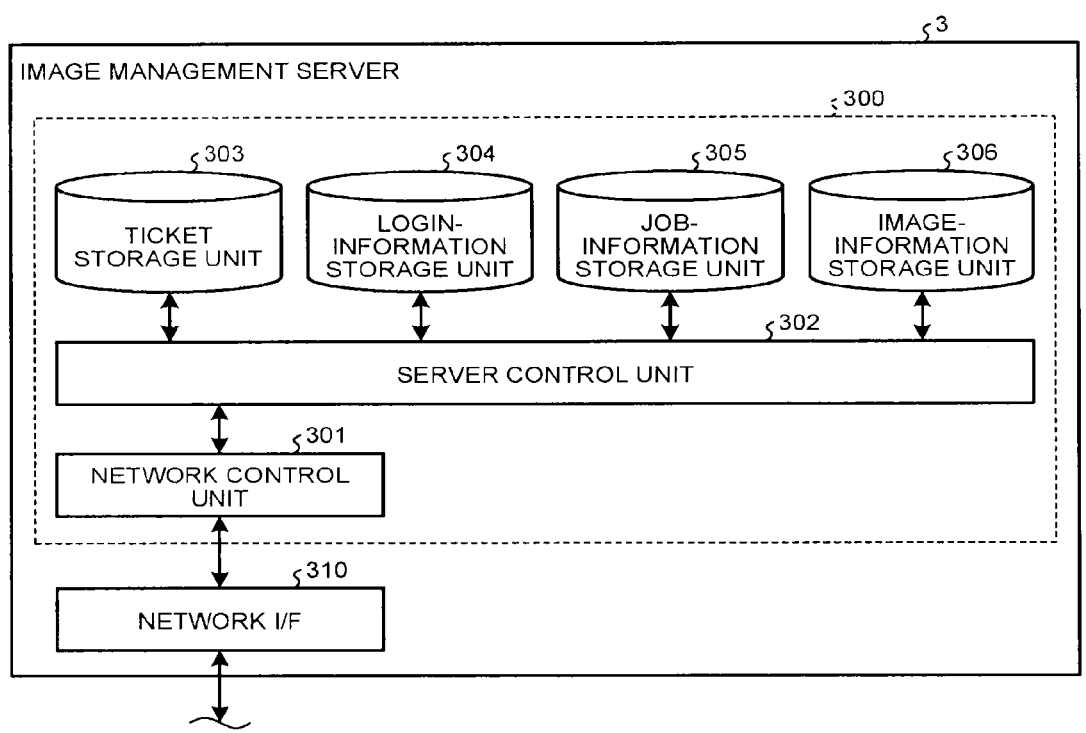
FIG. 5 is a block diagram illustrating a functional configuration of an image management server according to the first embodiment.

A functional configuration of the image management server 3 according to the first embodiment is described below with reference to FIG. 5. Referring to FIG. 5, the image management server 3 according to the first embodiment includes a controller 300 and a network I/F 310. The controller 300 includes a network control unit 301 and a server control unit 302. The controller 300 further includes a ticket storage unit 303, a login-information storage unit 304, a job-information storage unit 305, and an image-information storage unit 306 each of which is a storage unit for storing corresponding information.

The network I/F 310 is an interface which allows the image management server 3 to communicate with another device via the network. An Ethernet (registered trademark) interface or a like interface may be used as the network I/F 310. The network I/F 310 is implemented by the I/F 50 illustrated in FIG. 2.

The controller 300 is implemented in a combination of software and hardware. The controller 300 is a control unit which provides overall control of the image management server 3. The network control unit 301 acquires information input to the image management server 3 via the network I/F 310 and transmits information to another device via the network I/F 310.

The server control unit 302 is implemented by software program installed and running on the image management server 3 to provide functions of the image processing system according to the first embodiment. The server control unit 302 performs necessary processing by accessing the information storage units based on data transferred to and from the image processing apparatus 1 and the mobile terminal 2.

The ticket storage unit 303 is a storage unit for storing ticket information, which is generated each time login authentication is performed by the image management server 3. The ticket information according to the first embodiment is a character string for individually identifying each login authentication. The ticket storage unit 303 stores each ticket linked to an identifier of a user authenticated at a login authentication identified by the ticket and an identifier of the image processing apparatus 1 involved in the login authentication.

The login-information storage unit 304 stores information to be accessed by the server control unit 302 to perform login authentication. More specifically, the login-information storage unit 304 stores user identifiers for identifying individual users and passwords for verifying identities of the individual users linked to each other. The job-information storage unit 305 stores job management information for use by the image management server 3 to manage print jobs received from the client terminal 4 and deposited in the image management server 3. The job management information according to the first embodiment is information in which a job identifier for identifying a job is linked to a user identifier for identifying a user who has transmitted the job.

The image-information storage unit 306 is a storage unit which stores image information sets representing images to be printed in the jobs managed by the job-information storage unit 305 and management information of the images. The image management information according to the first embodiment is information in which an identifier for identifying an image is linked to an identifier for identifying a job by which the image is to be printed. In other words, in the first embodiment, the image-information storage unit 306 provides a function of depositing image information sets and is an example of "repository unit" according to an aspect of the present disclosure. Information stored in the ticket storage unit 303, the login-information storage unit 304, in the job-information storage unit 305, and in the image-information storage unit 306 are respectively described in detail later in description about operations of the entire system. In the first embodiment, the image management server 3 includes, but not limited, the single information processing apparatus. Alternatively, the image management server 3 may include two or more information processing apparatuses, for example. In short, aspects of the present disclosure are applicable to any image management system so long as the image management system manages image information, includes one or more information processing apparatuses, and is configured such that authentication request of an image processing apparatus (in the first embodiment, the image processing apparatus 1) connected to the image management system for the image information is accepted via an operation terminal (in the first embodiment, the mobile terminal 2) connected to the image management system.

Figure 6:
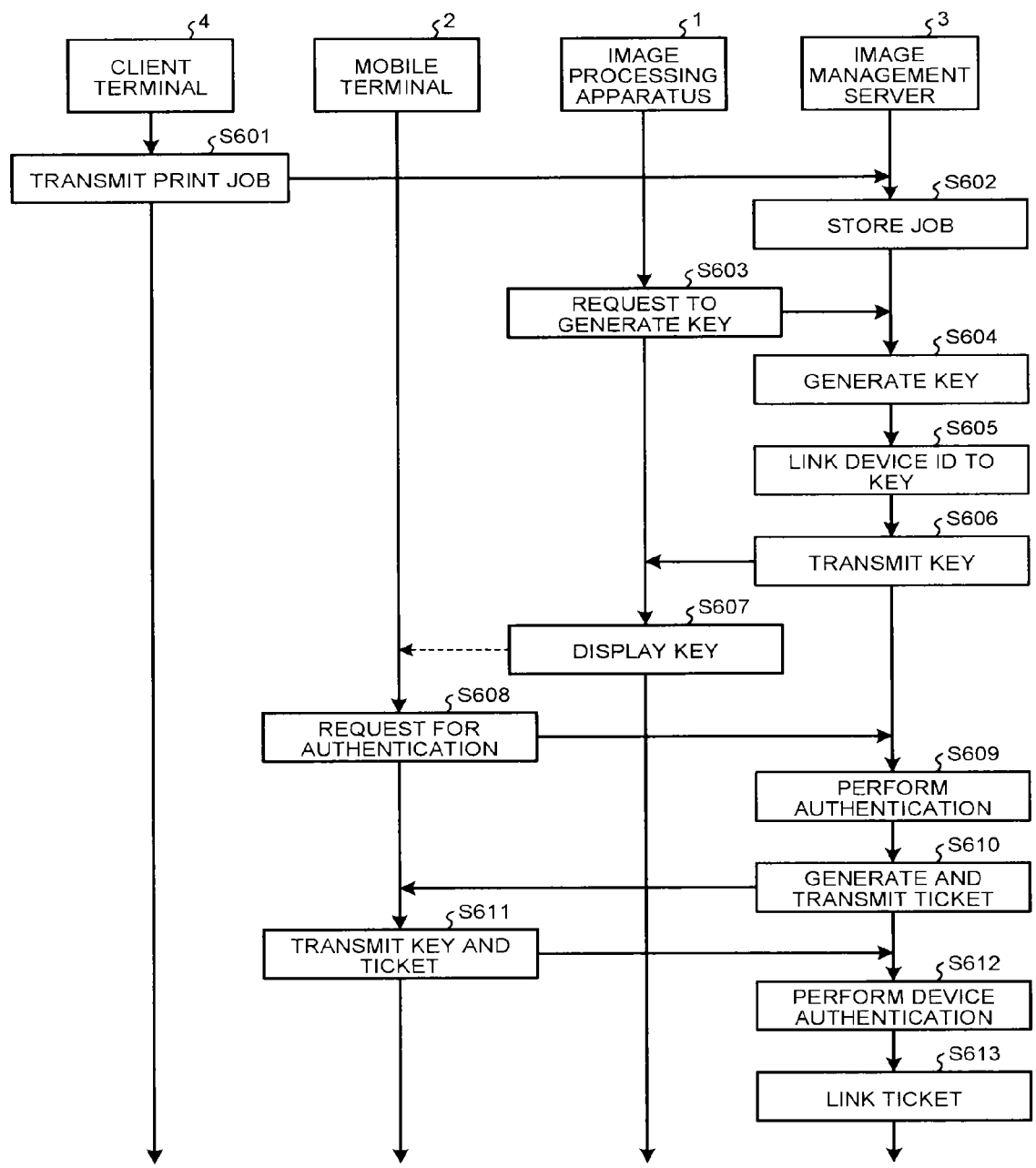
FIG. 6 is a sequence diagram illustrating operation of the system according to the first embodiment.

FIG. 6 is a sequence diagram illustrating how login authentication via the mobile terminal 2 is performed in the system according to the first embodiment. In the system according to the first embodiment, the GUI implemented by the client control unit 230 provides an operating unit 70 to be operated by a user for login authentication so that the user can perform login authentication using the user interface of the mobile terminal 2 providing superior operability rather than using the operating unit 70, which is poor in operability, of the image processing apparatus 1.

With a conventional technique, login authentication via the mobile terminal 2 is completed by transferring information only between the mobile terminal 2 and the image management server 3; accordingly, specifying one of the image processing apparatuses 1 cannot be involved in login authentication. In contrast, in the system according to the first embodiment, login authentication is performed for a specified (target) one of the image processing apparatuses 1 while ascertaining that a user being authenticated is near the target image processing apparatus 1. This is one of aspects of the system according to this embodiment.

The system according to the first embodiment operates as follows. As illustrated in FIG. 6, a user of the system operates the client terminal 4, causing the client terminal 4 to transmit a print job to the image management server 3 (S601). Upon receiving the print job, the server control unit 302 stores job management information in the job-information storage unit 305, and stores image management information and image information in the image-information storage unit 306 (S602). Jobs are deposited in the image management server 3 in this manner.

The transmission of the print job to the image management server 3 performed in S601 is performed by a printer driver which is installed in the client terminal 4 and provides a print-job generating function and a print-job transmitting function. More specifically, the transmission of the print job relies on settings of the printer driver, in which the image management server 3 is designated as destination of the print job. Alternatively, the printer driver may be configured such that the image processing apparatus 1 is designated as destination of the print job so that the print job is transferred by the image processing apparatus 1 to the image management server 3.

When the print job has been deposited in the image management server 3, the user operates such an operating unit as that illustrated in FIG. 7A of the image processing apparatus 1, causing the image processing apparatus 1 to transmit a request to generate a key to the image management server 3 (S603). The key is information for ascertaining that the user is near the image processing apparatus 1. More specifically, in S603, the image processing apparatus 1 transmits the request to generate the key together with a device ID, which is an identifier for individual identification of the image processing apparatus 1. In the first embodiment, the device ID is an example of "device identity information" according to an aspect of the present disclosure.

In the image management server 3 which has received the request to generate the key, the server control unit 302 generates a random character string as the key (S604). The key according to the first embodiment is a randomly-generated character string. In S604, the server control unit 302 functions as a character-string processing unit. The server control unit 302 generates such information as that illustrated in FIG. 8 by linking the device ID fed from the image processing apparatus 1 to the generated key, stores the information in the ticket storage unit 303 (S605), and transmits the generated key to the image processing apparatus 1 from which the request is issued (hereinafter, "request source") (S606). In the first embodiment, the key is an example of "first information" according to an aspect of the present disclosure. In the first embodiment, the server control unit 302 provides a function of, upon receiving the device ID (example of the "device identity information") from the image processing apparatus 1, generating the key (example of the "first information" according to an aspect of the present disclosure) to be linked with the device ID of the image processing apparatus 1 as described above. In other words, in the first embodiment, the server control unit 302 provides a function as "generating unit" according to an aspect of the present disclosure. In the first embodiment, the server control unit 302 provides a function of storing the generated key to which the device ID is linked in the ticket storage unit 303 (an example of "storage unit" according to an aspect of the present disclosure) as described above. In other words, in the first embodiment, the server control unit 302 provides a function as "first storing unit" according to an aspect of the present disclosure. The server control unit 302 provides a function of transmitting the generated key to the image processing apparatus 1 which is the request source (transmission source from which the device ID is transmitted) as described above. In other words, in the first embodiment, the server control unit 302 provides a function as "first transmitting unit" according to an aspect of the present disclosure.

Upon receiving the key, the image processing apparatus 1 displays the key as illustrated in FIG. 7B (S607). The key contains information generated by the image management server 3 and displayed on the display unit of the image processing apparatus 1 responsive to an action performed on the operating unit of the image processing apparatus 1. Accordingly, the key allows the image management server 3 to determine that, if the key is correctly entered by the user, the user is near the image processing apparatus 1. The information contained in the key is used as displayed-on-apparatus information.

Upon viewing the key displayed on the image processing apparatus 1, the user operates the mobile terminal 2, causing such a login screen as that illustrated in FIG. 9A to appear on the LCD 60 of the mobile terminal 2, enters a user ID and a password of the user, and performs an action requesting for authentication. Responsive to the user's action, the mobile terminal 2 issues an authentication request to the image management server 3 (S608). More specifically, in S608, the mobile terminal 2 transmits header information indicating that authentication is requested, and the user ID and the password entered by the user to the image management server 3. At this time, the client control unit 230 functions as an authentication-request transmitting unit.

Upon receiving the authentication request from the mobile terminal 2, the image management server 3 accesses the login-information storage unit 304 and performs authentication by verifying identity of the user based on the user ID and the password received together with the authentication request (S609). In S609, the server control unit 302 functions as an authentication processing unit. In the first embodiment, conceptually, the server control unit 302 provides a function of, upon receiving the authentication request from the mobile terminal 2, performing predetermined authentication (in the first embodiment, authentication for verifying identity of the user using the user ID and the password) according to the authentication request. In other words, in the first embodiment, the server control unit 302 provides a function as "authentication unit" according to an aspect of the present disclosure. In the first embodiment, the mobile terminal 2 is an example of "operation terminal" according to an aspect of the present disclosure. When the user is successfully authenticated, the image management server 3 generates ticket information, which is a character string for identifying this login. The image management server 3 generates such information as that illustrated in FIG. 10 by linking the user ID of the authenticated user with the ticket information and stores the generated information in the ticket storage unit 303. Furthermore, the image management server 3 transmits the ticket information with information indicating that the user is successfully authenticated to the mobile terminal 2 (S610). In S610, the server control unit 302 functions as a ticket processing unit which generates ticket link information. In the first embodiment, the ticket information is an example of "authentication identity information" according to an aspect of the present disclosure. In the first embodiment, the server control unit 302 provides a function of, when predetermined authentication is successfully performed, generating ticket information for identifying the predetermined authentication as described above. In other words, in the first embodiment, the server control unit 302 provides a function as "authentication-identity-information generating unit" according to an aspect of the present disclosure. In the first embodiment, the user ID related to the authentication request transmitted from the mobile terminal 2 is an example of "predetermined information related to authentication request" according to an aspect of the present disclosure. In the first embodiment, the server control unit 302 provides the function of linking the user TD related to the authentication request transmitted from the mobile terminal 2 to the generated ticket information and storing the ticket information in the ticket storage unit 303 (an example of the "storage unit" according to an aspect of the present disclosure) as described above. In other words, in the first embodiment, the server control unit 302 provides a function as "second storing unit" according to an aspect of the present disclosure. Furthermore, in the first embodiment, the server control unit 302 provides a function of transmitting the generated ticket information to the mobile terminal 2 which is a transmission source of the authentication request as described above. In other words, in the first embodiment, the server control unit 302 provides a function as "second transmitting unit" according to an aspect of the present disclosure.

In the mobile terminal 2 which has received the information indicating the authentication result and the ticket information, the client control unit 230 controls the display control unit 203, causing such a key entry screen as that illustrated in FIG. 9B to appear on the LCD 60. The user enters the key displayed in S607 into the key entry screen illustrated in FIG. 9B. When the key has been entered to the screen, the mobile terminal 2 transmits the key entered by the user and the ticket information received in S610 to the image management server 3 (S611). In S611, the client control unit 230 functions as an information-displayed-on-apparatus transmitting unit.

The operation of S611 is performed to notify the image management server 3 about which one of the image processing apparatuses 1 is to be used by the login-authenticated user. Data transmitted in S611 is information (hereinafter, "login-device identity information") for linking between the login and the image processing apparatus 1. In S611, the user is prompted to enter the key displayed on the display panel 140 of the image processing apparatus 1. This key is displayed on the display panel 140 responsive to the user's direct action performed on the image processing apparatus 1 in S603. Accordingly, the image management server 3 can determine that the authentication-target user is near the image processing apparatus 1 to be linked (hereinafter, the "link-target image processing apparatus 1") by verifying the key.

Upon receiving the login-device identity information, the image management server 3 performs device authentication, or, more specifically, authenticates the link-target image processing apparatus 1 by accessing the information illustrated in FIG. 8 stored in the ticket storage unit 303 using the device ID and the key contained in the received login-device identity information (S612). In S612, the server control unit 302 functions as an information-displayed-on-apparatus receiving unit. In S612, the image management server 3 determines whether or not the combination of the device ID and the key contained in the login-device identity information matches the combination of the information illustrated in FIG. 8 stored in the ticket storage unit 303.

If the link-target image processing apparatus 1 is successfully authenticated, the image management server 3 generates such information as that illustrated in FIG. 11 by linking the device ID contained in the login-apparatus identity information to the ticket information, and stores the generated information in the ticket storage unit 303 (S613). By performing the operation described above, the login process of logging into the image management server 3 via the mobile terminal 2 for the specified one of the image processing apparatuses 1 is completed. In the first embodiment, the server control unit 302 provides the following function. That is, upon receiving, from the mobile terminal 2, the ticket information (example of the "authentication identity information" according to an aspect of the present disclosure) transmitted in Step S610 and the key (example of the "first information" according to an aspect of the present disclosure) transmitted in Step S606, the server control unit 302 links the device ID (example of the "device identity information" according to an aspect of the present disclosure) stored in the ticket storage unit 303 (example of the "storage unit" according to an aspect of the present disclosure) to the received ticket information, and stores the linked information in the ticket storage unit 303. In short, in the first embodiment, the server control unit 302 provides a function as "third storing unit" according to an aspect of the present disclosure.

As described above, in the login process according to the first embodiment, a login request is issued by operating the GUI displayed by the application installed in the mobile terminal 2. Accordingly, a user can perform login authentication without using the operating unit, which is poor in operability, of the image processing apparatus 1. However, this login authentication is performed by transferring data between the mobile terminal 2 and the image management server 3; accordingly, there arises a need for means which specifies a target one of the image processing apparatuses 1 and, furthermore, prevents abuse by a malicious user.

Under the circumstance, the system according to the first embodiment is configured as follows. The image processing apparatus 1 generates a key by communicating with the image management server 3 according to user's operation. The key is a character string by which the image processing apparatus 1 can be uniquely specified and which is a random number validated only temporarily. The image processing apparatus 1 receives this key from the image management server 3 and presents the key to the user by displaying the key on the display unit of the image processing apparatus 1. This key allows ascertaining that the user is near the image processing apparatus 1, thereby preventing abuse by a malicious user.

The "ticket" information illustrated in FIGS. 10 and 11 is a character string for identifying each login. Meanwhile, expiration date may be set for a login. Such expiration date can be stored as being associated with each ticket illustrated in FIGS. 10 and 11. The image management server 3 may be configured to be capable of retrieving a ticket based on the information illustrated in FIG. 10 and deleting information pertaining to the ticket when a log-out action is explicitly made by a user.

Referring to FIGS. 10 and 11, the link information in which the user IDs and the tickets are linked and the link information in which the device IDs and the tickets are linked are presented in the separate tables. Alternatively, the information illustrated in FIGS. 10 and 11 may be combined into a single table using the tickets as a primary key. This is because the tickets can be used as a primary key in each of the tables.

Operation in a scenario in which, after a user has logged in through such operation as that illustrated in FIG. 6, the image processing apparatus 1 performs printing of a specified one of the jobs deposited in the image management server 3 is described below with reference to FIG. 12. In a state where the user has logged in through such operation as that illustrated in FIG. 6, such a button as that illustrated in FIG. 13A for requesting that a job list be displayed appears on the display unit of the image processing apparatus 1. When this button is pressed by the user, the image processing apparatus 1 transmits a request for a job list to the image management server 3 (S1201).

More specifically, in S1201, the image processing apparatus 1 transmits, in addition to header information indicating that the job list is requested, the device ID of the image processing apparatus 1 to the image management server 3. Upon receiving the job list request together with the device ID, the image management server 3 retrieves a ticket linked with the notified device ID from the link information in which the device IDs and the tickets are linked illustrated in FIG. 11 and determines whether or not the image processing apparatus 1 which is the request source of the job list is specified at login (S1202).

If the device ID received in S1201 is not retrieved in S1202, the reason for this retrieval failure can be: the image processing apparatus 1 which is the request source the job list is not specified at the login to the image management server 3; the login has been expired; the image processing apparatus 1 has already been logged out; or the like. Therefore, processing is brought to error termination. If the device ID is retrieved, the image management server 3 searches through the link information in which the user IDs and the tickets are linked illustrated in FIG. 10 for the ticket information linked to the device ID, thereby identifying the user authenticated at the login (S1203).

Job management information, which is information in which job IDs and user IDs are linked as illustrated in FIG. 14, is deposited in the job-information storage unit 305. After identifying the user in S1202, the image management server 3 retrieves, from such job management information as that illustrated in FIG. 14, a list of jobs linked to the identified user using a user ID of the identified user, and transmits the job list to the image processing apparatus 1 (S1204). Upon receiving the job list, the image processing apparatus 1 displays such a job list screen from which a job is selectable (hereinafter, sometimes referred to as "job selection screen") as that illustrated in FIG. 13B.

When the job selection screen illustrated in FIG. 13B is operated by the user to select a job, the image processing apparatus 1 accepts the job selection (S1205). The image processing apparatus 1 transmits a request for image information representing an image to be printed by the selected job to the image management server 3 (S1206). More specifically, in S1206, the image processing apparatus 1 transmits, in addition to a job ID of the selected job, the device ID of the image processing apparatus 1 to the image management server 3. In the first embodiment, the network control unit 301 of the image management server 3 provides a function of receiving an acquisition request from the image processing apparatus 1. The acquisition request is a request for one of the image information sets deposited in the image-information storage unit 306 (an example of the "repository unit" according to an aspect of the present disclosure) and contains the device ID (an example of the "device identity information" according to an aspect of the present disclosure) by which the image processing apparatus 1 is identified. In other words, in the first embodiment, the network control unit 301 of the image management server 3 provides a function as "acquisition-request receiving unit" according to an aspect of the present disclosure.

Upon receiving the image request together with the device ID, the image management server 3 searches through the link information in which the device IDs and the tickets are linked illustrated in FIG. 11 for the notified device ID to determine whether or not the device ID is contained in the link information, thereby determining whether or not the image processing apparatus 1 which is the request source of the job list has been specified at the login (S1207). Put another way, the operation of S1207 is an operation validating the image processing apparatus 1 which is the request source of the job list. In S1207, not only whether or not the notified device ID is contained in the link information but also whether or not the ticket is valid may be determined. If the system is configured to determine whether or not the ticket is valid in S1207, the server control unit 302 provides a function of determining whether or not the ticket information stored in in the ticket storage unit 303 as being linked with the user ID contained in the acquisition request transmitted from the image processing apparatus 1 and received by the network control unit 301 is valid. For example, the server control unit 302 may determine whether or not the ticket information is valid based on information indicating expiration date linked to the ticket information stored in the ticket storage unit 303 as being linked with the device ID contained in the acquisition request. In this configuration, the server control unit 302 provides a function as "determining unit" according to an aspect of the present disclosure. When the device ID is retrieved, the image management server 3 searches through the link information in which the user IDs and the tickets are linked illustrated in FIG. 10 for the ticket information linked with the device ID, thereby identifying the user authenticated at the login (S1208).

As described above, in the system according to the first embodiment, each time the image processing apparatus 1 transfers data to the image management server 3, the image processing apparatus 1 notifies the image management server 3 of the device ID of the image processing apparatus 1; the image management server 3 checks ticket validity based on the device ID. The system increases security level by virtue of such operation.

After identifying the user, the image management server 3 searches through the image-information storage unit 306 for the job ID specified (contained) in the image request. The image-information storage unit 306 manages images to be printed on a job-by-job basis using information in which job IDs for identifying each job and image IDs for identifying each image are linked as illustrated in FIG. 15. The image management server 3 retrieves an image ID linked to the specified job ID, retrieves information representing an image identified by the image ID, and transmits the image information to the image processing apparatus 1 (S1209). In the first embodiment, conceptually, the server control unit 302 provides a function of transmitting an image information set, which is one of the image information sets deposited in the ticket storage unit 303 and requested by the acquisition request, to the image processing apparatus 1 from which the acquisition request is transmitted if the server control unit 302 determines that the ticket information stored in the ticket storage unit 303 as being linked to the device ID contained in the acquisition request transmitted from the image processing apparatus 1 is valid. In other words, in the first embodiment, the server control unit 302 provides a function as "image-information transmitting unit" according to an aspect of the present disclosure.

In the image processing apparatus 1 which has received the image information from the image management server 3, the main control unit 101, the image processing unit 104, and the engine control unit 102 process the image information as described above; and the print engine 160 performs printing according to the image information (S1210). The system according to the first embodiment completes printing of a deposited job in this manner. In the operation illustrated in FIG. 12, the server control unit 302 functions as an image providing unit.

As described above, in the system according to the first embodiment, a user performs an action for login authentication on the GUI displayed on the screen of the mobile terminal 2. Because the need to operate the operating unit, which is poor in operability, of the image processing apparatus 1 is obviated, convenience can be increased. Furthermore, login authentication which involves specifying the image processing apparatuses 1 is enabled by using the key displayed on the display unit of the image processing apparatus 1 when transferring data to and from the mobile terminal 2 and the image management server 3.

The key is generated through data transfer between the image processing apparatus 1 and the image management server 3. Accordingly, the key allows the image management server 3 to determine whether or not an authentication-target user has viewed the display unit of the image processing apparatus 1, thereby preventing abuse of the system by a malicious user.

Thus, the system according to the first embodiment allows, in a situation where a terminal controlled independently of an image processing apparatus is used as an operating unit of the image processing apparatus, enhancing security of authentication of another device.

In the system according to the first embodiment, as described above through S603 to S607, the login process via the mobile terminal 2 is performed by using the key generated through data transfer between the image processing apparatus 1 and the image management server 3. Such a configuration is advantageous in ensuring security; this is because, because the key is a random number generated each time, the user needs to view the display unit of the image processing apparatus 1.

However, because the key described above is used to identify the image processing apparatus 1, the apparatus may alternatively be identified using the device ID in lieu of the key. In that case, the operation of from S603 to S607 is omitted, and the image processing apparatus 1 displays its own device ID on the display unit. The user operating the mobile terminal 2 specifies the image processing apparatus 1 for which the login is performed by entering, in lieu of the key, the device ID in the operation of from S608 to S611. Because of being specific to each apparatus, the device ID is not necessarily displayed on the display unit; the device ID may alternatively be indicated on a sticker or the like pasted on a casing of the apparatus.

In the system according to the first embodiment described above, the key generated by the image management server 3 is transmitted as it is to the image processing apparatus 1 and displayed thereon. Alternatively, the system may be configured such that the image management server 3 encrypts the key, which is generated in S604 and linked to the device ID in S605, and transmits the encrypted key in S606. When the system is configured as such, the encrypted key is displayed on the display unit of the image processing apparatus 1 and visually identified by the user.

Upon receiving the encrypted key from the mobile terminal 2 in S611, the image management server 3 decrypts the encrypted key, and performs the device authentication in S612 using the decrypted key. By performing operation in this manner, information contained in the key can be transferred securely, which leads to a further increase in security level.

In the system according to the first embodiment described above, print jobs are deposited in the image management server 3. However, what is to be deposited in the image management server 3 is not limited to print jobs or, in other words, print instructions. Alternatively, the system may be configured such that the image processing apparatus 1 acquires one of image information sets, which are simply deposited in the image management server 3, and performs printing according to the image information set. In this case, the image processing apparatus 1 transmits a request for a list of images, in lieu of a request for a job list, to the image management server 3 in S1201.

In the system according to the first embodiment described above, the apparatus to be provided with an image managed by the image management server 3 is the image processing apparatus 1 which performs printing. However, the image processing apparatus 1 is only an example, and the embodiment is applicable to any apparatus to be provided with an image via a network. Examples of an apparatus to which the embodiment is applicable include a projector for projecting an image received via a network onto a screen and a display apparatus for displaying such an image on a large screen. When the embodiment is applied to such an apparatus, effect similar to that described above will be obtained if the apparatus is limited in primary function and includes an operating unit which is poor in operability.

Second Embodiment

In the system according to the first embodiment, a user visually identifies the key displayed on the image processing apparatus 1 and manually enters the key to the mobile terminal 2. In contrast, a second embodiment of the present invention allows omitting such user's action, thereby further increasing convenience of the user. Repeat use of reference characters in the first and second embodiments is intended to represent same or analogous elements or steps, and repeated detailed description is omitted.

In the second embodiment, in contrast to the first embodiment where a user visually identifies a key and manually enters the key to the GUI of the mobile terminal 2, information contained in the key is input to the mobile terminal 2 by reading an image using an image capturing function provided in the mobile terminal 2. This configuration obviates user's need to enter the visually identified key, which is a number of several to over ten digits, thereby increasing convenience.

Figure 16:
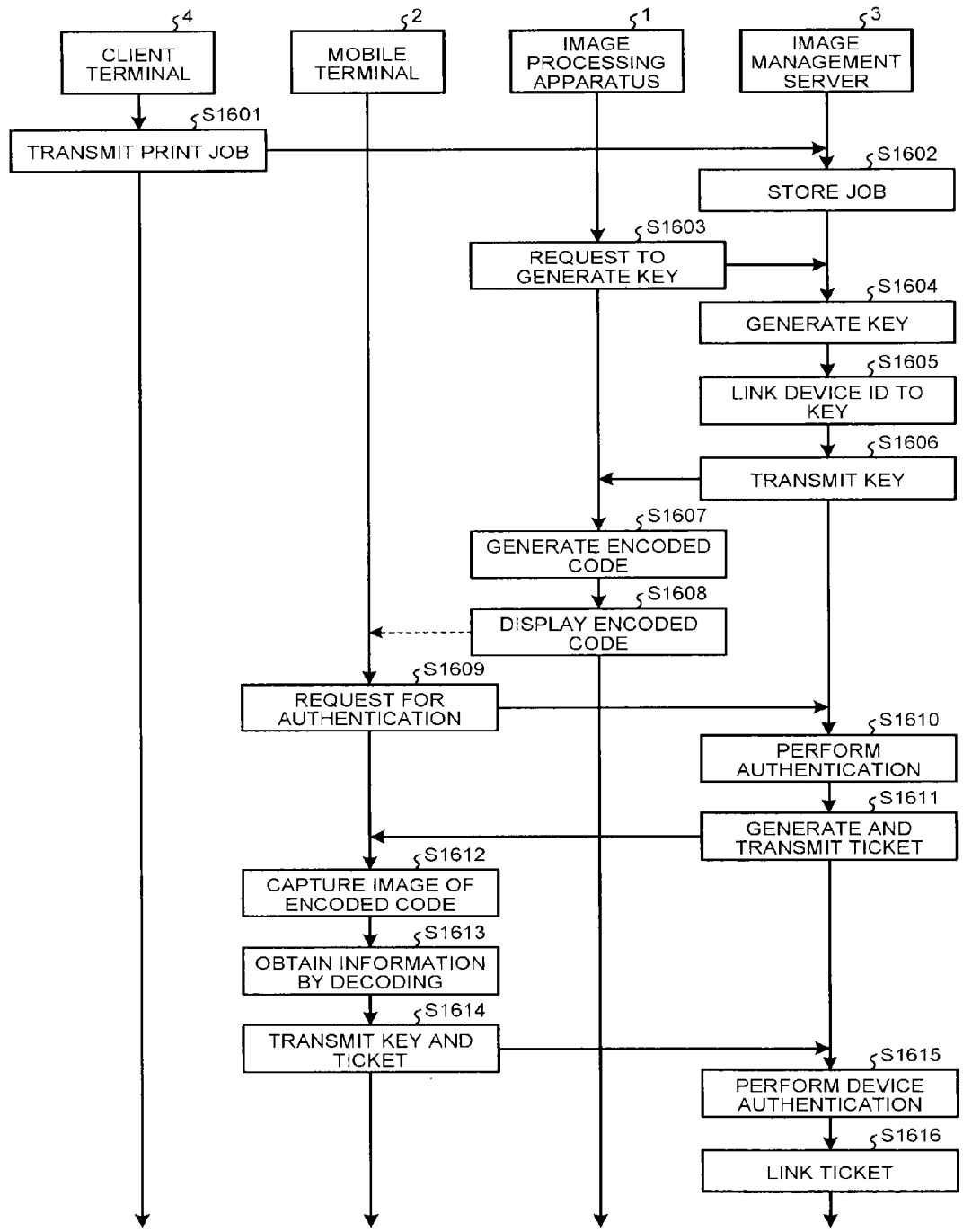
FIG. 16 is a sequence diagram illustrating operation of a system according to a second embodiment of the present invention.

FIG. 16 is a sequence diagram, equivalent to FIG. 6 of the first embodiment, illustrating how login authentication according to the second embodiment is performed. As illustrated in FIG. 16, operation is performed as in the first embodiment until the image management server 3 transmits a key to the image processing apparatus 1 (S1601 to S1606). In the image processing apparatus 1 which has received the key from the image management server 3, the main control unit 101 generates an encoded code from information contained in the received key (S1607). The encoded code is an image, such as a barcode or a Quick Response (QR) (registered trademark) code, representing information by a graphic pattern.

After generating the encoded code from the key received from the image management server 3, the main control unit 101 causes the encoded code to be displayed on the display panel 140 (S1608). In this state, an image of the encoded code can be captured using an image capturing device, such as a mobile camera, provided in the mobile terminal 2. Subsequent operation including transmitting an authentication request from the mobile terminal 2 to the image management server 3, authentication by the image management server 3, and generating a ticket and transmitting the ticket to the image management server 3 is performed as in the first embodiment (S1609 to S1611).

In the mobile terminal 2 which has received information indicating an authentication result and the ticket information, the client control unit 230 controls the image capturing device such as the mobile camera provided in the mobile terminal 2 to start an encoded-code reading mode. In the encoded-code reading mode, an image being captured by the image capturing device provided in the mobile terminal 2 is displayed on the display unit of the mobile terminal 2; the client control unit 230 recognizes the encoded code by analyzing the image captured by the image capturing device.

More specifically, when the user places an encoded-code such as a QR code displayed on the display panel 140 of the image processing apparatus 1 within an image capture range of the image capturing device, the mobile terminal 2 captures an image of the encoded code (S1612). The client control unit 230 recognizes the encoded code and decodes the graphic pattern, into which the key is encoded, to obtain source information contained in the key (S1613). The operation described above allows the user to enter the information contained in the key only by capturing an image of the encoded code displayed on the display panel 140 of the image processing apparatus 1, thereby increasing user's convenience. Operation of from S1614 is performed as in the operation of from S611 of FIG. 6.

Figure 17:
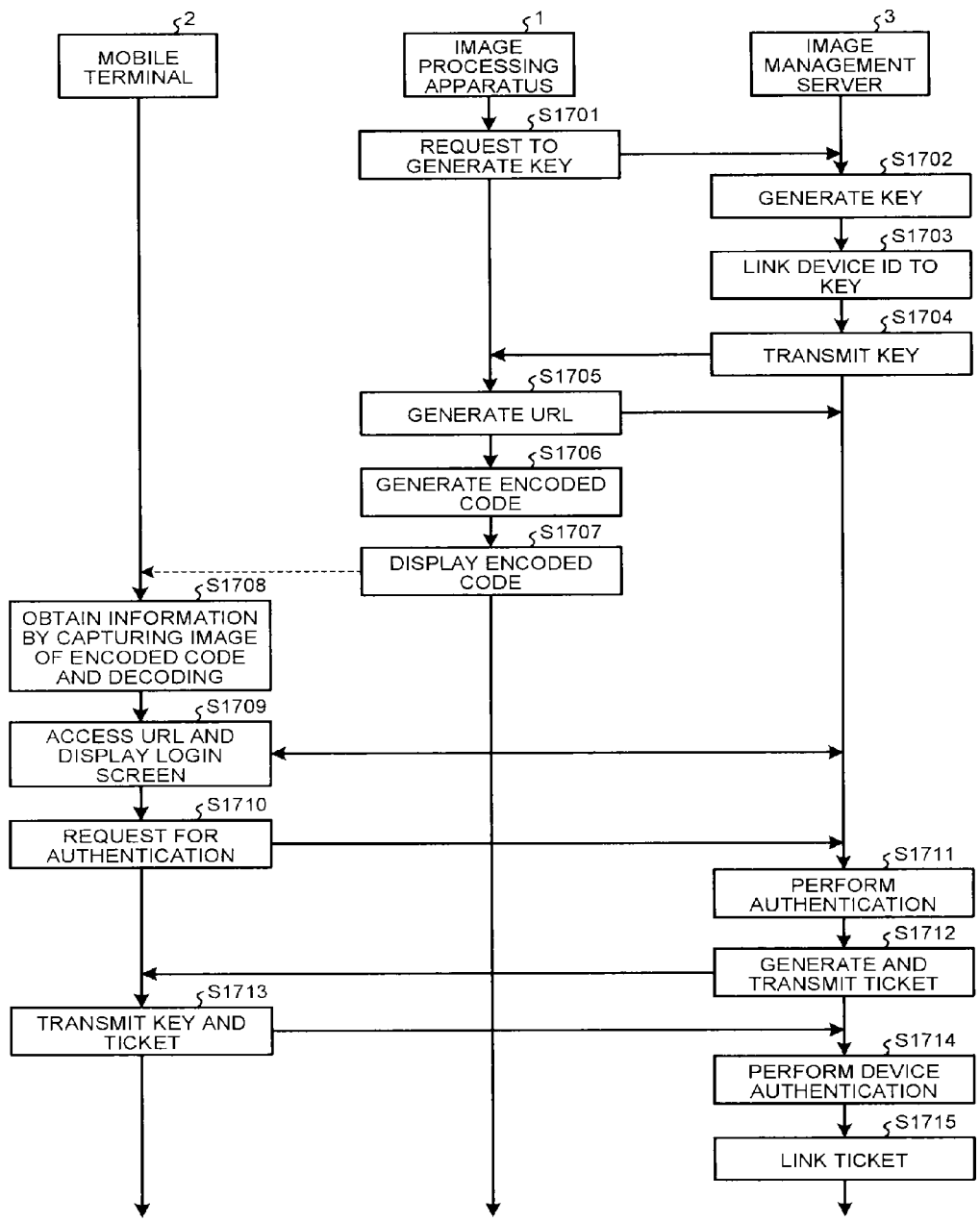
FIG. 17 is a sequence diagram illustrating operation of the system according to the second embodiment.

Such an encoded code displayed on the display panel 140 of the image processing apparatus 1 may be used in providing another function than the above-described function of encoding information contained in a key and a device ID. For example, the encoded code may be used to provide a uniform resource locator (URL) access function. A configuration in which the encoded code provides a URL access function is described below with reference to FIG. 17. FIG. 17 is a sequence diagram illustrating operation of the system in which an encoded code provides a URL access function. Print-job deposition steps are omitted from FIG. 17.

As illustrated in FIG. 17, operation is performed as in the first embodiment until the image management server 3 transmits a key to the image processing apparatus 1 (S1701 to S1704). In the image processing apparatus 1 which has received the key from the image management server 3, the main control unit 101 generates a URL for use in issuing a login authentication request according to information (source information) contained in the received key and the device ID of the image processing apparatus 1 (S1705), and generates an encoded code from the generated URL (S1706).

More specifically, in S1705, the image processing apparatus 1 generates the URL by joining the device ID and the key to a destination address of the login request with a query part. After generating a URL-based encoded code by performing such operation, the main control unit 101 causes the encoded code to be displayed on the display panel 140 (S1707). In this state, an image of the encoded code captures using the image capturing device, such as the mobile camera, provided in the mobile terminal 2.

The mobile terminal 2 obtains the source information by capturing an image of the encoded code displayed in this way and decoding (S1708), thereby acquiring the URL of a web site for issuing the login request. The URL contains, in addition to the address of the web site, the device ID and the source information contained in the key joined with the query part.

Upon acquiring the URL, the mobile terminal 2 accesses the URL and displays such a login screen as that illustrated in FIG. 9A as a web site (S1709). The mobile terminal thus acquires the device ID and the information contained in the key contained in the URL simultaneously. Because this configuration obviates the need of configuring the GUI of the client control unit 230 into such a login screen as that illustrated in FIG. 9A, the client control unit 230 is required to provide only a web browser function for accessing URLs. Accordingly, the function of the client control unit 230 can be simplified.

When the login screen is displayed via the web browser, the user enters information to the screen. Following operation including transmitting an authentication request from the mobile terminal 2 to the image management server 3, authentication by the image management server 3, and generating a ticket and transmitting the ticket to the image management server 3 is performed as in the operation of FIG. 16 (S1710 to S1712).

Upon receiving the ticket from the image management server 3, the mobile terminal 2 generates login-device identity information by adding the ticket information acquired together with the authentication result to the information contained in the key obtained by accessing the URL, and transmits the login-device identity information to the image management server 3 (S1713). Operation following S1713 is performed as in FIG. 6 or 16, and then the login process completes.

Third Embodiment

In the system according to the first embodiment, as described above with reference to FIG. 12, the image processing apparatus 1 specifies its own identity using the device ID; the image management server 3 identifies a ticket, or a login, based on such link information in which device IDs and tickets are linked as that illustrated in FIG. 11 using the device ID notified from the image processing apparatus 1. Furthermore, the image management server 3 identifies a login user based on such link information in which user IDs and tickets are linked as that illustrated in FIG. 10.

Figure 18:
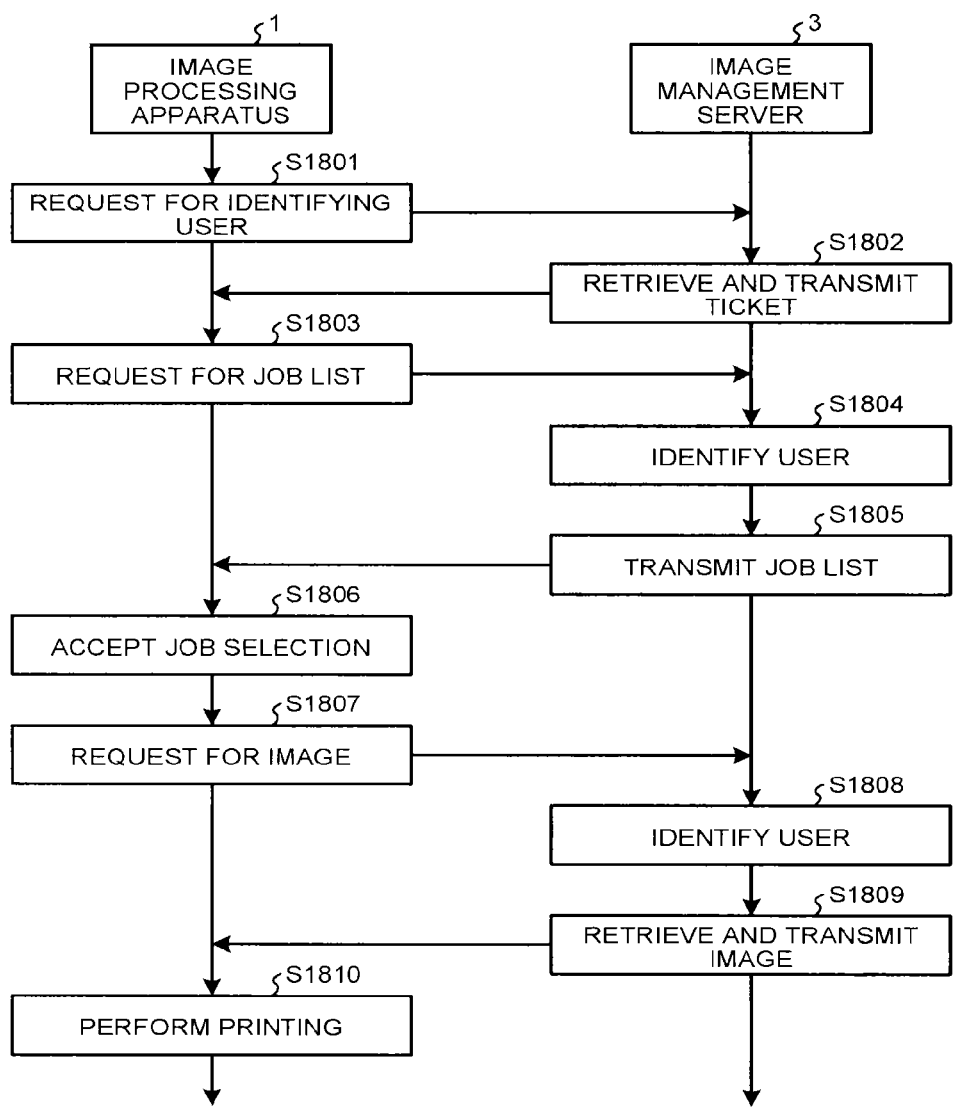
FIG. 18 is a sequence diagram illustrating operation of a system according to a third embodiment of the present invention.

In contrast, in a third embodiment of the present invention, the image processing apparatus 1 acquires the ticket so that processing load imposed by data transfer between the image processing apparatus 1 and the image management server 3 is reduced. FIG. 18 is a sequence diagram, equivalent to FIG. 12, illustrating operation in a scenario in which, after a user has logged in through such operation as that illustrated in FIG. 6, 16, or 17, one of the jobs deposited in the image management server 3 is selected, and the image processing apparatus 1 performs printing of the job.

Also in the third embodiment illustrated in FIG. 18, such a button as that illustrated in FIG. 13A for requesting for display of a job list is displayed. When this button is pressed by a user, the image processing apparatus 1 requests the image management server 3 to identify the user (S1801). The request for identifying the user issued in S1801 is a request for identifying the user that has logged into the system for a specified one of the image processing apparatuses 1 and transmitted together with the device ID of the image processing apparatus 1.

Upon receiving the request for identifying the user, the image management server 3 retrieves a ticket linked with the notified device ID from the link information in which the device IDs and the tickets are linked illustrated in FIG. 11 and transmits the ticket to the image processing apparatus 1 (S1802). The image processing apparatus 1 temporarily stores the ticket information. Data transfer between the image processing apparatus 1 and the image management server 3 in the following operation is performed using the ticket.

As described above with reference to FIGS. 10 and 11, the ticket information is linked to the device ID and the user ID. Accordingly, the image processing apparatus 1 can identify the device ID and the user ID by, when transferring data to the image management server 3, transmitting the ticket together with the data. If it is found that the target device ID is not contained in the link information in an attempt of retrieving the device ID in S1802, the image management server 3 brings processing to error termination.

Upon receiving the ticket from the image management server 3, the image processing apparatus 1 transmits a request for a job list (S1803). More specifically, in S1803, the image processing apparatus 1 transmits, rather than the device ID of the image processing apparatus 1, the ticket information acquired in S1802 to the image management server 3. Upon receiving the job list request and the ticket, the image management server 3 searches through the link information in which the user IDs and the tickets are linked illustrated in FIG. 10, thereby identifying the user authenticated at the login identified by the notified ticket (S1804).

After identifying the user in S1804, the image management server 3 retrieves, from such job management information as that illustrated in FIG. 14, a list of jobs linked to the identified user using a user ID of the identified user, and transmits the job list to the image processing apparatus 1 (S1805). Upon receiving the job list, the image processing apparatus 1 displays such a job list screen from which a job is selectable (hereinafter, sometimes referred to as "job selection screen") as that illustrated in FIG. 13B.

When the job selection screen illustrated in FIG. 13B is operated by the user to select a job, the image processing apparatus 1 accepts the job selection (S1806). The image processing apparatus 1 transmits a request for information representing an image to be printed according to the selected job to the image management server 3 (S1807). More specifically, in S1807, the image processing apparatus 1 transmits, in addition to the job ID of the job by which the image is requested, the ticket received in S1802.

Upon receiving the image request and the ticket, the image management server 3 searches through the link information in which the user IDs and the tickets are linked illustrated in FIG. 10 for the notified ticket, thereby identifying the user authenticated at the login identified by the notified ticket (S1808). After identifying the user, the image management server 3 retrieves image information as in S1209 of FIG. 12, and transmits the image information to the image processing apparatus 1 (S1809). Upon receiving the image information from the image management server 3, the image processing apparatus 1 performs printing as in S1210 of FIG. 12 (S1810). The system according to the third embodiment completes printing of a deposited job in this manner.

In the first embodiment illustrated in FIG. 12, the image management server 3 receives a device ID together with a job list request or an image request. Accordingly, the image management server 3 identifies a user after acquiring a ticket using the link information in which the tickets and the device IDs are linked illustrated in FIG. 11. In contrast, in the system according to the third embodiment, the ticket is notified (transmitted) to the image processing apparatus 1 through the operation of S1801 and S1802. Because the need of acquiring the ticket is eliminated from the subsequent operation, processing can be simplified.

Fourth Embodiment

As described above with reference to FIGS. 6 and 12, the system according to the first embodiment is configured such that operation performed via the mobile terminal 2 is only the login authentication, and the job list, from which a job is to be selected, is displayed on the operating unit of the image processing apparatus 1. In contrast, in a fourth embodiment of the present invention, a job list, from which a job is to be selected, is displayed on the mobile terminal 2.

Figure 19:
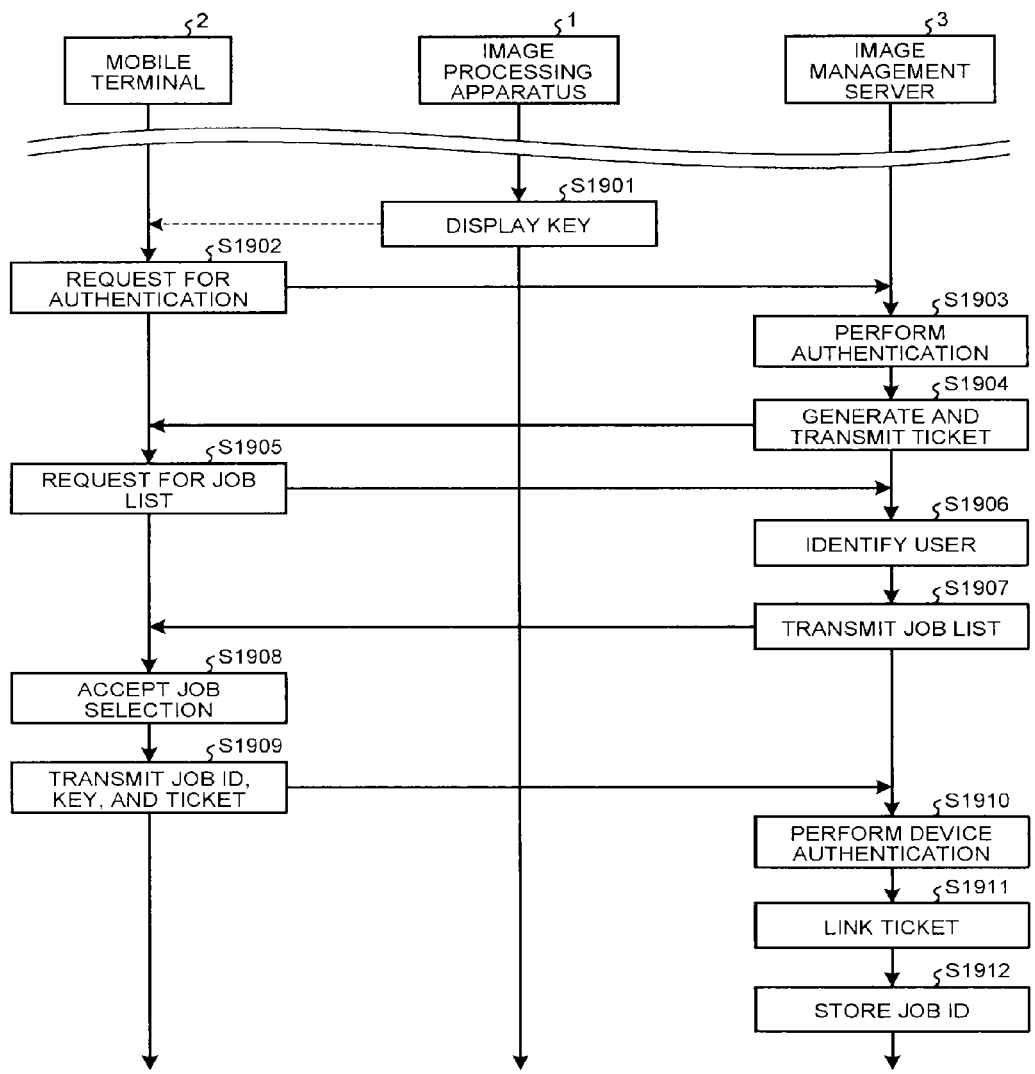
FIG. 19 is a sequence diagram illustrating operation of a system according to a fourth embodiment of the present invention.

FIG. 19 is a sequence diagram illustrating operation for displaying a job list, from which a job is to be selected, on the mobile terminal 2 of the system according to the fourth embodiment. Referring to FIG. 19, operation to be performed until the image management server 3 displays a key (S1901) is performed as in S601 through S607 described above with reference to FIG. 6. Operation from transmitting an authentication request from the mobile terminal 2 to the image management server 3 until generating a ticket and transmitting the ticket to the image management server 3 (S1902 to S1904) is performed as in S608 to S610 described above with reference to FIG. 6.

In the mobile terminal 2 which has received an authentication result and the ticket information, the client control unit 230 transmits a request for a job list to the image management server 3 (S1905). More specifically, in S1905, the mobile terminal 2 transmits, in addition to header information indicating that the job list is requested, the ticket information received as a response to the authentication request. At this time, the client control unit 230 functions as a list requesting unit. Upon receiving the job list request and the ticket, the image management server 3 searches through the link information in which the user IDs and the tickets are linked illustrated in FIG. 10 for the ticket, thereby identifying the user authenticated at the login identified by the ticket (S1906).

After identifying the user in S1906, the image management server 3 retrieves, from such job management information as that illustrated in FIG. 14, a list of jobs linked to the identified user using a user ID of the identified user, and transmits the job list to the mobile terminal 2 (S1907). Upon receiving the job list, the mobile terminal 2 displays such a job list screen from which a job is selectable (hereinafter, sometimes referred to as "job selection screen") as that illustrated in FIG. 13B.

When the job selection screen illustrated in FIG. 13B is operated by the user to select a job, the mobile terminal 2 accepts the job selection (S1908). In the mobile terminal 2 which has received the job selection, the client control unit 230 controls the display control unit 203, causing such a key entry screen as that illustrated in FIG. 9B to appear on the LCD 60.

The user enters the key displayed in S1901 into the key entry screen illustrated in FIG. 9B. When the key has been entered, the mobile terminal 2 transmits the key entered by the user, the ticket information received in S1904, and a job ID of the selected job to the image management server 3 (S1909). In other words, the information to be transmitted in S1909 is login-device identity information containing the job ID. At this time, the client control unit 230 functions also as an image specifying unit.

Upon receiving the login-device identity information containing the job ID, the image management server 3 performs device authentication as in S612 of FIG. 6 (S1910) and links the device ID to the ticket information as in S613 (S1911). The image management server 3 further links the job ID to the ticket information to which the device ID is linked, thereby storing the job ID indicating the selected job (S1912). As a result, such link information as that illustrated in FIG. 20 is generated.

In the system according to the fourth embodiment, a job to be performed is identified through data transfer between the mobile terminal 2 and the image management server 3, and a job ID of the job is stored in the image management server 3. This configuration allows a user to select a job using the GUI of the mobile terminal 2 rather than using the operating unit, which is poor in operability, of the image processing apparatus 1. As a result, user's convenience can be further increased.

Figures 20, 21:
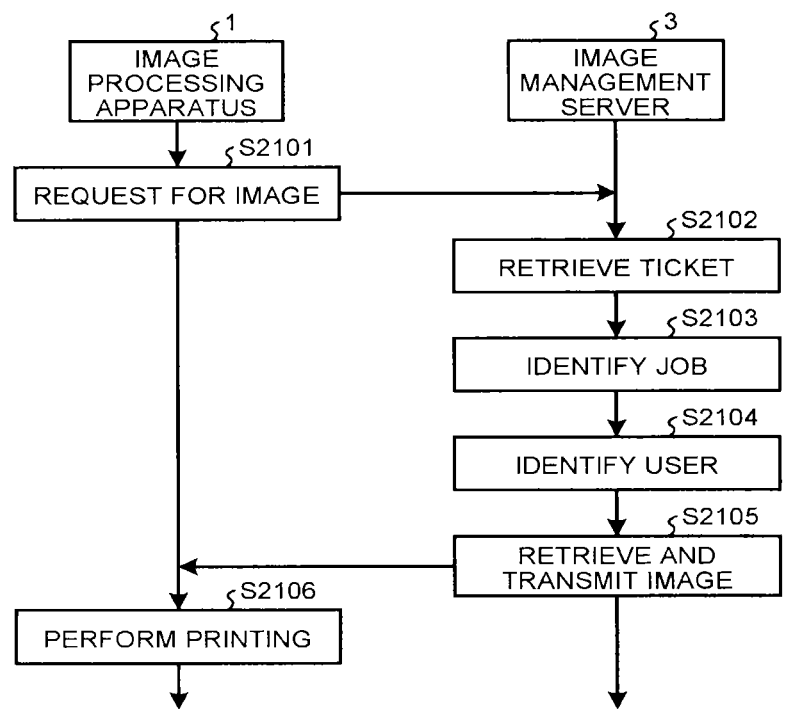
FIG. 20 is a diagram illustrating link information in which device IDs, tickets, and job IDs are linked according to the fourth embodiment.
FIG. 21 is a sequence diagram illustrating operation of the system according to the fourth embodiment.
Figure 22:
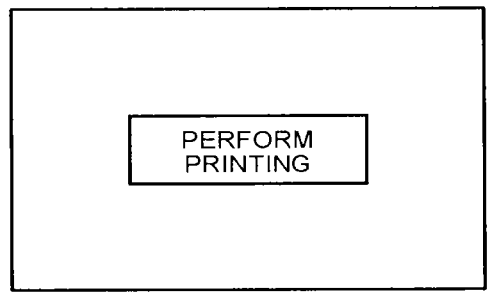
FIG. 22 is a diagram illustrating an example of display on the display panel of the image processing apparatus according to the fourth embodiment.

FIG. 21 is a sequence diagram illustrating how the image processing apparatus 1 performs a print job, the job ID of which is stored in the image management server 3 through the operation illustrated in FIG. 19. In a state where login and selection of a to-be-performed job have been performed through such operation as that illustrated in FIG. 19, such a button as that illustrated in FIG. 22 for requesting that a print job be performed appears on the display unit of the image processing apparatus 1. When this button is pressed by the user, the image processing apparatus 1 transmits a request for information representing an image to be printed to the image management server 3 (S2101). More specifically, in S2101, the image processing apparatus 1 transmits, in addition to header information indicating that the image is requested, the device ID of the image processing apparatus 1 to the image management server 3.

Upon receiving the image request together with the device ID, the image management server 3 determines whether or not the image processing apparatus 1 which is the request source of the image has been specified at the login by searching through the link information in which the device IDs, the tickets, and the job IDs are linked illustrated in FIG. 20 for the notified device ID (S2102). When the device ID is retrieved, the image management server 3 identifies a job by retrieving a job ID linked to the device ID (S2103). The image management server 3 searches through the link information in which the user IDs and the tickets are linked illustrated in FIG. 10 for the ticket linked to the device ID, thereby identifying the user authenticated at the login (S2104).

After identifying the user, the image management server 3 retrieves image information as in S1209 of FIG. 12 by searching through the image-information storage unit 306 for the job ID acquired in S2103, and transmits the image information to the image processing apparatus 1 (S2105). In the image processing apparatus 1 which has received the image information from the image management server 3, the main control unit 101, the image processing unit 104, and the engine control unit 102 process the image information as described above, and the print engine 160 performs printing according to the image information (S2106). The system according to the fourth embodiment completes printing of a deposited job in this manner.

As described above, in the system according to the fourth embodiment, a job list is displayed by the GUI of the mobile terminal 2, and a job to be performed is selected via the GUI of the mobile terminal 2. A job ID of the job selected using the mobile terminal 2 is transmitted to the image management server 3, in which the job ID is stored as being linked with a ticket, so that the image processing apparatus 1 can acquire the selected job. Thus, according to the fourth embodiment, because the image processing apparatus 1 and a job ID are linked via a ticket, the image processing apparatus 1 can acquire an image of a job selected by a user even when the image processing apparatus 1 issues an image request without specifying the job ID.

Fifth Embodiment

In the systems according to the first to fourth embodiments, the image processing apparatus 1 acquires an image stored in the image management server 3 and performs printing of the image. Meanwhile, the image processing apparatus 1 has, in addition to the image forming function, a scanning function. Accordingly, there can be a situation in which the image processing apparatus 1 stores information representing an image obtained by scanning in the image management server 3. A system according to a fifth embodiment of the present invention configured for such a situation is described below.

Figure 23:
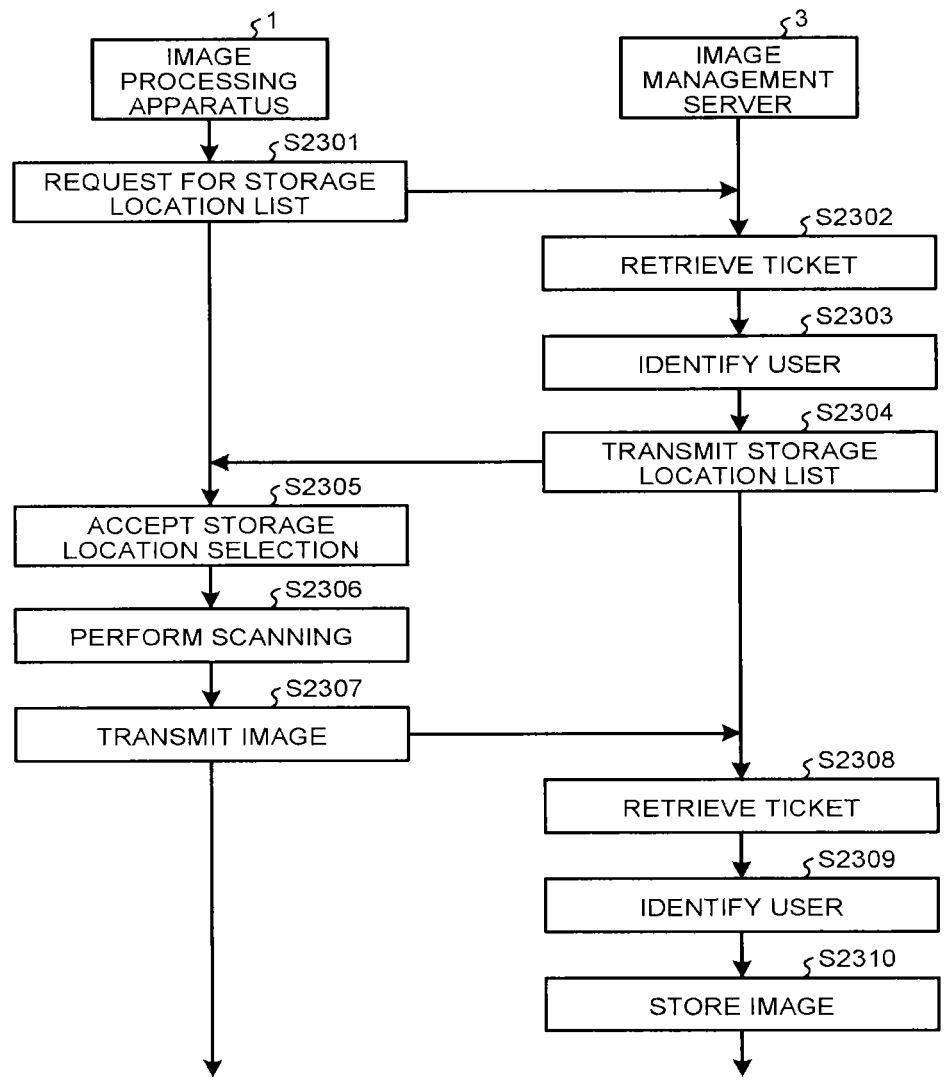
FIG. 23 is a sequence diagram illustrating operation of a system according to a fifth embodiment of the present invention.

FIG. 23 is a sequence diagram illustrating operation of the system according to the fifth embodiment for storing image information representing an image obtained by scanning in the image management server 3. The operation illustrated in FIG. 23 is based on a premise that a user of the system has already been login authenticated for a specified one of the image processing apparatuses 1 through such operation as described above with reference to FIG. 6.

In a state where the login is completed through such operation as that illustrated in FIG. 6, such a button as that illustrated in FIG. 24A for requesting that a list of storage locations for storing an image obtained by scanning be displayed appears on the display unit of the image processing apparatus 1. When this button is pressed by the user, the image processing apparatus 1 transmits a request for the storage location list to the image management server 3 (S2301).

More specifically, in S2301, the image processing apparatus 1 transmits, in addition to header information indicating that the storage location list is requested, the device ID of the image processing apparatus 1 to the image management server 3. Upon receiving the storage location list request together with the device ID, the image management server 3 retrieves a ticket linked to the notified device ID from the link information in which the device IDs and the tickets are linked illustrated in FIG. 11 and determines whether or not the image processing apparatus 1 which is the request source of the storage location list has been specified at the login (S2302).

When the device ID is retrieved, the image management server 3 searches through the link information in which the user IDs and the tickets are linked illustrated in FIG. 10 for the ticket information linked to the device ID, thereby identifying the user authenticated at the login (S2303).

Storage locations are managed by the image management server 3 in the form of storage-location management information in which the user IDs and folder paths are linked as illustrated in FIG. 25. Each folder path indicates a storage location where a corresponding image is stored. After identifying the user in S2303, the image management server 3 retrieves, from such storage-location management information as that illustrated in FIG. 25, a list of storage locations linked with the identified user by using a user ID of the identified user, and transmits the storage location list to the image processing apparatus 1 (S2304). Upon receiving the storage location list, the image processing apparatus 1 displays such a storage location list screen (hereinafter, sometimes referred to as "storage-location selection screen") from which a storage location is selectable as that illustrated in FIG. 24B.

When selection from the storage-location selection screen illustrated in FIG. 24B is made by the user, the image processing apparatus 1 accepts the storage location selection (S2305). The image processing apparatus 1 performs scanning to generate image information (S2306), and transmits the generated image information, a result of the storage location selection accepted in S2305, and the device ID of the image processing apparatus 1 to the image management server 3 (S2307).

Upon receiving the image obtained by scanning, the result of storage location selection, and the device ID, the image management server 3 retrieves a ticket linked to the notified device ID from the link information in which the device IDs and the tickets are linked illustrated in FIG. 11 to determine whether or not the image processing apparatus 1 which is the request source of the storage location list has been specified at the login (S2308).

When the device ID is retrieved, the image management server 3 searches through the link information in which the user IDs and the tickets are linked illustrated in FIG. 10 for the ticket linked to the device ID, thereby identifying the user authenticated at the login (S2309). After identifying the user, the image management server 3 stores the image information obtained by scanning in the selected storage location in accordance with the notified result of storage location selection (S2310), at which processing ends. In S2310, the server control unit 302 functions as an image storing unit.

As described above, the system according to the fifth embodiment allows selecting and determining a storage location of an image obtained by scanning by the image processing apparatus 1 depending on a login user when the image is to be stored in the image management server 3.

Meanwhile, the fifth embodiment is described by way of the example illustrated in FIG. 23 in which multiple file paths indicating multiple storage locations are linked to a single user ID, and a storage location is selected through the operation of from S2301 to S2305. The fifth embodiment may alternatively be embodied such that a single file path is linked to a single user ID, and an image obtained by scanning is automatically stored in a single storage indication indicated by the file path.

According to an aspect of the present invention, in a situation where a terminal controlled independently of an image processing apparatus is used as an operating unit of the image processing apparatus, information security in authentication of another device can be enhanced.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image management system comprising:
an image management apparatus managing images, the images being providable via a network;
a portable information-processing terminal configured to display a screen via which an authentication request is to be issued to the image management apparatus; and
an image recipient apparatus configured to be provided with one or more of the images managed by the image management apparatus, wherein
the portable information-processing terminal includes
an authentication-request transmitting unit configured to transmit the authentication request responsive to an action performed by a user on the displayed screen, and
an information-displayed-on-apparatus transmitting unit configured to transmit displayed-on-apparatus information acquired based on information displayed on the image recipient apparatus in association with transmission of the authentication request to a destination of the authentication request, and
the image management apparatus includes
an authentication processing unit configured to perform authentication of the user's access to the image management apparatus in response to the authentication request,
a ticket processing unit configured to generate ticket link information by
generating ticket information for individual identification of the access authentication,
linking a user identifier of the authenticated user to the ticket information,
acquiring a device identifier of the image recipient apparatus by using the displayed-on-apparatus information received in association with the authentication, and
linking the device identifier to the ticket information, and
an image providing unit configured to provide an image requested by an image request received from the image recipient apparatus, wherein the image providing unit is configured to, when receiving the image request, acquire the device identifier of the source device of the image request, the device identifier being for individual identification of the source device, and check an authentication status of a user of the source device of the image request based on ticket information linked to the acquired device identifier,
wherein
the image management apparatus further includes a management-information processing unit configured to
generate management link information by linking management information, the management information being information generated upon receiving a request from the image recipient apparatus and for use by the image management apparatus in managing the image recipient apparatus, to the device identifier of the image recipient apparatus from which the request is transmitted, and
transmit the management information to the image recipient apparatus, the information-displayed-on-apparatus transmitting unit is configured to acquire the management information displayed on the image recipient apparatus as the displayed-on-apparatus information and transmit the management information to the destination of the authentication request, and the ticket processing unit is configured to retrieve the device identifier by searching through the link information for the management information received in association with the authentication and link the device identifier to the ticket information.

2. The image management system according to claim 1, wherein
the displayed-on-apparatus information is the device identifier displayed on the image recipient apparatus.

3. The image management system according to claim 1, wherein
the management-information processing unit is configured to encrypt the management information and transmit the encrypted management information to the image recipient apparatus,
the information-displayed-on-apparatus transmitting unit is configured to acquire the encrypted management information displayed on the image recipient apparatus and transmit the acquired management information to the destination of the authentication request, and
the ticket processing unit is configured to
decrypt the encrypted management information received in association with the authentication,
retrieve the device identifier by searching through the link information for the decrypted management information, and
link the device identifier to the ticket information.

4. The image management system according to claim 3, wherein
the management information is a character string randomly generated in response to the request from the image recipient apparatus.

5. The image management system according to claim 4, wherein
the information-displayed-on-apparatus transmitting unit is configured to acquire the displayed-on-apparatus information by analyzing an image obtained by image-capturing a graphic pattern displayed on the image recipient apparatus, the graphic pattern being encoded information.

6. The image management system according to claim 4, wherein
the graphic pattern being the encoded information is obtained by encoding information, the information allowing display of a screen for use in transmitting the authentication request.

7. The image management system according to claim 1, wherein
the management information is a character string randomly generated in response to the request from the image recipient apparatus.

8. The image management system according to claim 7, wherein
the information-displayed-on-apparatus transmitting unit is configured to acquire the displayed-on-apparatus information by analyzing an image obtained by image-capturing a graphic pattern displayed on the image recipient apparatus, the graphic pattern being encoded information.

9. The image management system according to claim 7, wherein
the graphic pattern being the encoded information is obtained by encoding information, the information allowing display of a screen for use in transmitting the authentication request.

10. The image management system according to claim 1, wherein
the information-displayed-on-apparatus transmitting unit is configured to acquire the displayed-on-apparatus information by analyzing an image obtained by image-capturing a graphic pattern displayed on the image recipient apparatus, the graphic pattern being encoded information.

11. The image management system according to claim 1, wherein
the image providing unit is configured to
perform validation of the source device of the image request by retrieving, from the link information, the ticket information linked to the device identifier of the source device acquired when receiving the image request using the device identifier of the source device and
transmit the image requested by the image request to the source device of the image request if the source device is validated.

12. The image management system according to claim 1, wherein
the image providing unit is configured to, when receiving the image request, acquire the device identifier of the source device of the image request and transmit the ticket information linked to the acquired device identifier to the source device and check the authentication status of the user by receiving the transmitted ticket information each time subsequent processing is performed.

13. The image management system according to claim 1, wherein
the portable information-processing terminal further includes
a list requesting unit configured to receive the ticket information generated for the authentication performed in response to the authentication request from the image management apparatus as a response to the authentication request and transmit a request for a list of the images managed by the image management apparatus to the image management apparatus together with the received ticket information, and
an image specifying unit configured to transmit an image identifier indicating an image selected by an action performed on a screen displayed based on the received image list to the image management apparatus together with the received ticket information,
the image providing unit is configured to
receive the ticket information and the image identifier indicating the selected image and generate the ticket link information by linking the image identifier to the ticket information, and
when receiving the image request, acquire the device identifier of the source device of the image request, retrieve the ticket information linked to the acquired device identifier, and transmit information representing the image identified by the image identifier linked to the retrieved ticket information to the source device.

14. An image management system for managing image information sets, the image management system including one or more information processing apparatuses, accepting authentication of an image processing apparatus connected to the image management system for the image information sets via an operation terminal connected to the image management system, and comprising:
- a repository unit configured to store the image information sets;
- a generating unit configured to, upon receiving device identity information for identification of a transmission-source image processing apparatus, the transmission-source image processing apparatus being one of the image processing apparatuses, from the transmission-source image processing apparatus, generate first information to be linked to the device identity information;
- a first storing unit configured to link the first information generated by the generating unit to the device identity information and store the first information linked to the device identity information in a storage unit;
- a first transmitting unit configured to transmit the first information generated by the generating unit to the transmission-source image processing apparatus;
- an authentication unit configured to, upon receiving an authentication request from the operation terminal, perform predetermined authentication according to the authentication request;
- an authentication-identity-information generating unit configured to generate authentication identity information when the predetermined authentication is successfully performed by the authentication unit;
- a second storing unit configured to link the authentication identity information generated by the authentication-identity-information generating unit to predetermined information related to the authentication request and store the authentication identity information linked to the predetermined information in the storage unit;
- a second transmitting unit configured to transmit the authentication identity information generated by the authentication-identity-information generating unit to the operation terminal, the operation terminal being a transmission source of the authentication request;
- a third storing unit configured to, upon receiving, from the operation terminal, the authentication identity information transmitted from the second transmitting unit and the first information transmitted from the first transmitting unit, link the device identity information stored in the storage unit as being linked to the first information to the received authentication identity information, and store the device identity information linked to the first information in the storage unit;
- an acquisition-request receiving unit configured to receive an acquisition request from an image processing apparatus of the image processing apparatuses, the acquisition request requesting for an image information set of the image information sets deposited in the repository unit and containing the device identity information for identification of the image processing apparatus;
- a determining unit configured to determine whether or not the authentication identity information stored in the storage unit as being linked to the device identity information contained in the acquisition request received by the acquisition-request receiving unit is valid; and
- an image-information transmitting unit configured to, if the determining unit determines that the authentication identity information is valid, transmit the image information set requested by the acquisition request received by the acquisition-request receiving unit to the image processing apparatus from which the acquisition request is transmitted.

15. An image management system comprising:
- an image management apparatus managing images, the images being providable via a network;
- a portable information-processing terminal configured to display a screen via which an authentication request is to be issued to the image management apparatus; and
- an image recipient apparatus configured to be provided with one or more of the images managed by the image management apparatus, wherein the portable information-processing terminal includes
- an authentication-request transmitting unit configured to transmit the authentication request responsive to an action performed by a user on the displayed screen, and
- an information-displayed-on-apparatus transmitting unit configured to transmit displayed-on-apparatus information acquired based on information displayed on the image recipient apparatus in association with transmission of the authentication request to a destination of the authentication request, and the image management apparatus includes
- an authentication processing unit configured to perform authentication of the user's access to the image management apparatus in response to the authentication request,
- a ticket processing unit configured to generate ticket link information by
  - generating ticket information for individual identification of the access authentication,
  - linking a user identifier of the authenticated user to the ticket information,
  - acquiring a device identifier of the image recipient apparatus by using the displayed-on-apparatus information received in association with the authentication, and
  - linking the device identifier to the ticket information, and
- an image providing unit configured to provide an image requested by an image request received from the image recipient apparatus, wherein the image providing unit is configured to, when receiving the image request, acquire the device identifier of the source device of the image request, the device identifier being for individual identification of the source device, and check an authentication status of a user of the source device of the image request based on ticket information linked to the acquired device identifier, wherein the portable information-processing terminal further includes
- a list requesting unit configured to receive the ticket information generated for the authentication performed in response to the authentication request from the image management apparatus as a response to the authentication request and transmit a request for a list of the images managed by the image management apparatus to the image management apparatus together with the received ticket information, and
- an image specifying unit configured to transmit an image identifier indicating an image selected by an action performed on a screen displayed based on the received image list to the image management apparatus together with the received ticket information, the image providing unit is configured to
- receive the ticket information and the image identifier indicating the selected image and generate the ticket link information by linking the image identifier to the ticket information, and
- when receiving the image request, acquire the device identifier of the source device of the image request, retrieve the ticket information linked to the acquired device identifier, and transmit information representing the image identified by the image identifier linked to the retrieved ticket information to the source device.

\* \* \* \* \*